United States Patent [19]

Itomitsu et al.

[11] Patent Number: 5,220,656
[45] Date of Patent: Jun. 15, 1993

[54] SYSTEM FOR SELECTING CONTROL PARAMETER FOR MICROINSTRUCTION EXECUTION UNIT USING PARAMETERS AND PARAMETER SELECTION SIGNAL DECODED FROM INSTRUCTION

[75] Inventors: Fujio Itomitsu; Masahito Matsuo, both of Itami, Japan

[73] Assignee: Mitsubishi Denki Kabushiki Kaisha, Tokyo, Japan

[21] Appl. No.: 457,413

[22] Filed: Dec. 26, 1989

[30] Foreign Application Priority Data

Dec. 26, 1988 [JP] Japan ................. 63-331765

[51] Int. Cl.$^5$ ........................... G06F 9/22; G06F 9/30
[52] U.S. Cl. .......................... 395/375; 364/258;
    364/259; 364/261.2; 364/262.8; 364/261.3;
    364/938; 364/946.6; 364/944.4; 364/946.7;
    364/DIG. 1; 395/800
[58] Field of Search ... 364/200 MS File, 900 MS File;
    395/375, 800

[56] References Cited

U.S. PATENT DOCUMENTS

| | | | |
|---|---|---|---|
| 3,889,242 | 6/1975 | Melmer, Jr. | 364/200 |
| 4,312,034 | 1/1982 | Gunter et al. | 364/200 |
| 4,384,324 | 5/1983 | Kim et al. | 364/200 |
| 4,589,067 | 5/1986 | Porter et al. | 364/200 |
| 4,763,246 | 8/1988 | Holt et al. | 364/200 |
| 4,870,567 | 9/1989 | Kitamura et al. | 364/200 |
| 4,945,511 | 7/1990 | Itomitsu et al. | 364/900 |

FOREIGN PATENT DOCUMENTS 62-24326 7/1987 Japan .

OTHER PUBLICATIONS

Sakamura (ed.), "Tron Project 1987—Open-Architecture Computer Systems" *Proc. 3rd Tron Proj. Symposium*, Springer-Verlag, Tokyo (1987).

*Primary Examiner*—Thomas C. Lee
*Assistant Examiner*—Ken S. Kim
*Attorney, Agent, or Firm*—Townsend and Townsend Khourie and Crew

[57] ABSTRACT

A device and method for generating execution controlling information (operation designating parameter) for an instruction execution means is provided. The device operates by selecting and composing a parameter (bit field) selected from among the bits of an instruction code and a parameter obtained as a result of decoding the instruction to be executed. The process makes it possible to reduce the size of a micro ROM by processing one instruction having various formats by the same micro-instruction.

7 Claims, 19 Drawing Sheets (SERIAL BIT NUMBER)

0    7 8    15 16    23 24    31

(BIT NUMBER IN EACH BYTE)

N     N+1     N+2     N+3
⎿204    ⎿204

(ADDRESS)

←LOW ADDRESS        HIGH ADDRESS→ ⎾202
←MSB SIDE            LSB SIDE→

→→DIRECTION OF READ INSTRUCTION→→

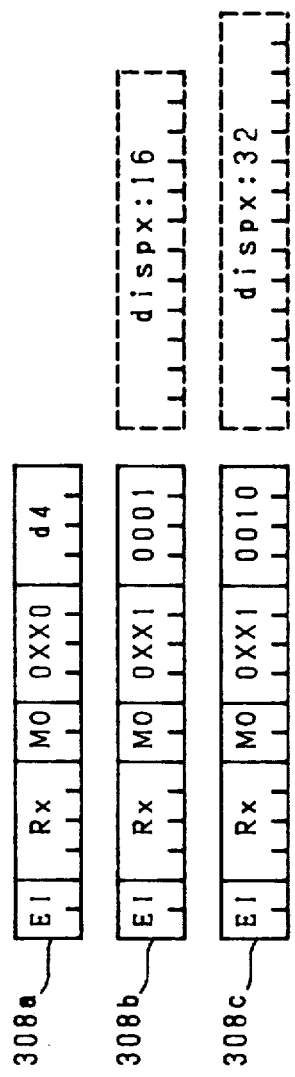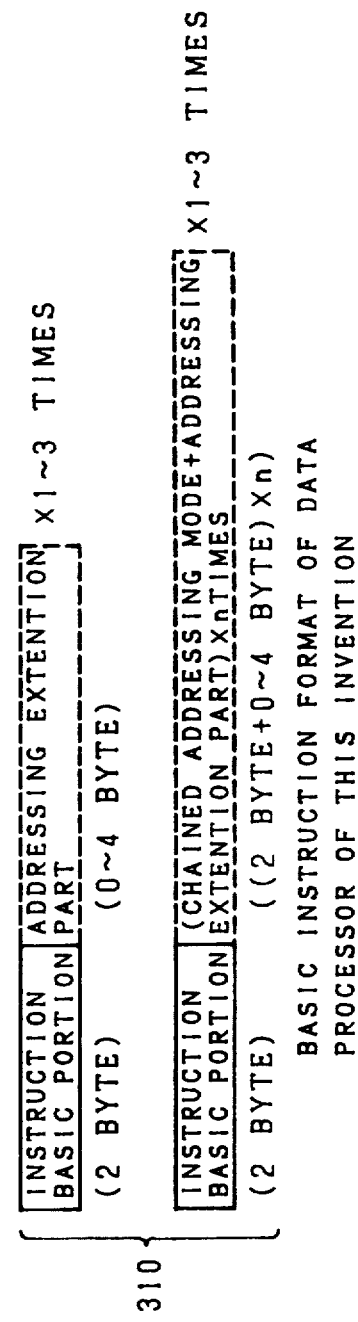

Fig. 29

| INSTRUCTION | OPERATION DESIGNATING PARAMETER | FLAG MASK F X V L M Z | ALU OPERATION |
|---|---|---|---|
| MOV | 1001* |     m      m | TRANSFFER |
| ADD | 0000* |     m | ADDITION |
| SUB | 0001* |     m | SUBTRACTION |
| AND | 01000 |     m  m m m | LOGICAL PRODUCT (AND) |
| OR  | 01001 |     m  m m m | LOGICAL SUM (OR) |
| XOR | 01010 |     m  m m m | LOGICAL SUM |

312 — MOV
314 — ADD
316 — SUB
318 — AND
320 — OR
322 — XOR

*: Don't Care
m: MASK (NO CHANGE OF FLAG)
FLAG: F(GENERAL), X(CARRY), V(OVERFLOW), L(LOW), M(MSB), Z(ZERO)

Fig. 31

INSTRUCTION CODE: $D_{00}D_{01}D_{02}D_{03}\cdots D_{15}$ 324 326

| EXTCNT | D CODE PARAMETER |
|---|---|
| 000 | $D_{02}D_{03}D_{04}D_{05}D_{06}D_{07}$ |
| 001 | $D_{10}D_{11}D_{06}D_{07}D_{08}D_{09}$ |
| 010 | $D_{03}D_{08}D_{09}D_{02}D_{04}D_{05}$ |
| 011 | $D_{13}D_{14}D_{15}D_{03}D_{04}D_{05}$ |
| 100 | LATCHED CONTENT OF LAST TIME |

EXTCNT: PARAMETER CUT-OUT CONTROL SIGNAL

Fig. 33

MOV:G    src/EaR, dest/EaW

330 — | 110100 | RR | EaR | 100010 | WW | EaW |

MOV:Q    src/###, dest/ShW

332 — | 011 | ### | WW | 00 | ShW |

MOV:L    src/ShR, dest/Rn

334 — | 00 | Rn | RR | 01 | ShR |

Fig. 34

| INSTRUCTION | EXTCNT | D CODE PARAMETER | PARM | PARMCNT |
|---|---|---|---|---|
| MOV:G | 000 | 0010** | 100** | 1(D CODE IS SELECTED) |
| MOV:Q | 010 | *001** | 10010 | 0(DECODER OUTPUT IS SELECTED) |
| MOV:L | 001 | ****01 | 10010 | 0(DECODER OUTPUT IS SELECTED) |

*:Don't Care

SYSTEM FOR SELECTING CONTROL PARAMETER FOR MICROINSTRUCTION EXECUTION UNIT USING PARAMETERS AND PARAMETER SELECTION SIGNAL DECODED FROM INSTRUCTION

BACKGROUND OF THE INVENTION

1. Field of the Invention

The present invention relates to a data processor wherein execution of instructions is controlled by a microprogram, and to be further detailed, relates to a data processor which processes a set of instructions wherein one instruction has various formats.

2. Description of Related Art

In the conventional data processors, the data processor is known which is constituted in a manner that a specific bit field (hereinafter referred to as parameter) is cut out from an instruction code to specify an operand size, an ALU operation or the like, and this parameter is given to an instruction execution unit to execute the instruction. As an example of such a data Processor, description is made hereinafter and with reference to U.S. Pat. No. 4,312,034.

First, FIG. 1 is a block diagram showing a configuration of the above-described conventional data processor.

In FIG. 1, numeral 71 designates an instruction register, which latches an instruction code to be executed next. Numeral 72 designates an instruction decoder, which is concretely constituted with a PLA (Programmable Logic Array). This instruction decoder 72 decodes an instruction given from the instruction register 71, and outputs a micro entry address. Numeral 73 designates a micro entry address latch, which latches the micro entry address given from the instruction decoder 72. Numeral 74 designates a micro ROM which outputs a micro-instruction designated by the micro entry address given from the micro entry address latch 73. Numeral 75 designates an micro-instruction register, which latches the micro-instruction outputted from the micro ROM 74. Numeral 76 designates a parameter latch, which latches a bit field as a parameter cut out from the instruction code latched in the instruction register. Numeral 77 designates a multiplexer, which selects either of the outputs of the microinstruction register 75 and the parameter latch 76. Numeral 78 designates an ALU, which executes an ALU operation according to the output of the multiplexer 77. Numeral 79 designates a data operation unit constituted with the multiplexer 77 and the ALU 78.

The operation of such a conventional data processor is as follows.

When an instruction using the ALU such as addition, subtraction, logical product, logical sum, exclusive-or or the like is outputted from the instruction register 71, the instruction is decoded by the instruction decoder 72, and an entry address of a micro-program used for executing the operation is latched in the micro entry address latch 73. The micro-instruction designated by the micro entry address which is kept latched in the micro entry address latch 73 is read from the micro ROM 74, being latched in the micro instruction register 75.

On the other hand, a parameter required for the actual ALU operation is cut out from the instruction code latched in the instruction register 71, and is latched in the parameter latch 76. Information obtained by multiplexing the field designating ALU operation among information latched in the micro-instruction register 75 and the information latched in the parameter latch 76 by the multiplexer 77 is given to the ALU 78, and based on this information, a concrete ALU operation is performed in the data operation unit 79.

Thus, the size of the micro ROM is curtailed by adopting a configuration capable of processing instructions such that different ALU operations are to be executed by the same micro-instruction.

Since the conventional data processor is constituted as described above, in the case where a set of instructions is processed wherein one instruction has various formats, bit allocation differs depending on each instruction format even for the same instruction, and therefore the parameter to be cut out differs. Accordingly, it is required to set in advance the entry address of the micro-program on a format basis, and therefore a problem exists that the size of the micro ROM is enlarged.

SUMMARY OF THE INVENTION

In such circumstances, the present invention purposes to provide a data processor capable of effecting processing by the same one microinstruction even where an instruction of the instruction set is processed wherein one instruction has a plurality of formats.

The data processor of the present invention comprises a device for selecting a parameter (bit field) being cut out from an instruction code of an instruction to be executed and a parameter (bit field) obtained as a result of decoding the above-mentioned instruction by an instruction decoder, and composes them to generate execution controlling information for an instruction execution means, that is, a parameter for designating the operation. Therefore a parameter (bit field) being cut out from an instruction code and a parameter (bit field) outputted from the instruction decoder are selected and composed to generate a parameter for designating an operation, and the operation is executed by direction of this parameter for designating an operation. The above and further objects and features of the invention will more fully be apparent from the following detailed description with accompanying drawings.

BRIEF DESCRIPTION OF THE DRAWINGS

FIG. 25 is a schematic diagram showing an addressing mode of the data processor of the present invention, FIG. 28 is a schematic diagram showing a basic instruction format of the data processor of the present invention, FIG. 29 is a schematic diagram showing information such as parameters or the like, FIG. 30 is a block diagram showing a more detailed configuration of the data processor of the present invention, FIG. 31 is a block diagram showing a D code parameter of the data processor of the present invention, FIG. 33 is a schematic diagram showing an instruction code of a NOV instruction of the data processor of the present invention, FIG. 34 depicts the EXTCNT signal in each instruction processing, with the parameter value of the D code, the PARN signal and the PARNCNT signal.

DESCRIPTION OF THE PREFERRED EMBODIMENTS

Hereinafter, a detailed description of the present invention is provided based on drawings showing one embodiment thereof.

(1) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format system specifically devised for the purpose of writing highly frequent instructions in a short format. For example, as to a two-operand instruction, two formats are provided; a general-type format which has basically a configuration of "four bytes+extension part(s)" and allows the utilization of all addressing modes and a reduced-type format allowing only the use of a highly frequent instruction and an addressing mode.

The meanings of symbols appearing in the depicted instruction format of the data processor of the present invention are as follows:

| — : | Portion wherein operation code is put. |
|---|---|
| # : | Portion wherein literal or immediate value is put. |
| Ea: | Portion for generating an operand in a general-type 8-bit addressing mode. |
| Sh: | Portion for designating an operand in a reduced-type 6-bit addressing mode. |
| Rn: | Portion for designating an operand in a register by the register number. |

Figure 1:
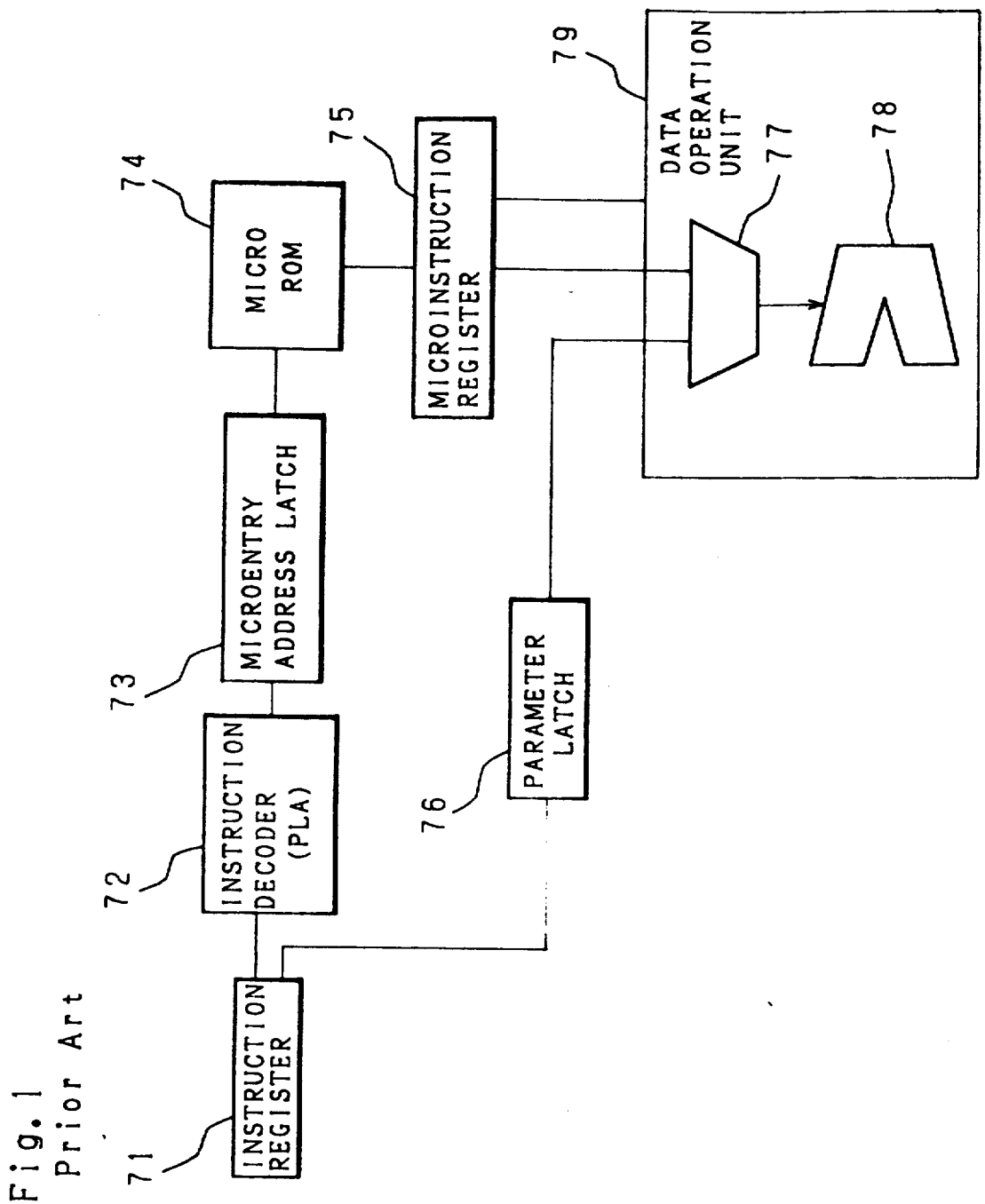
FIG. 1 is a block diagram showing a configuration of a conventional data processor.
Figure 2:
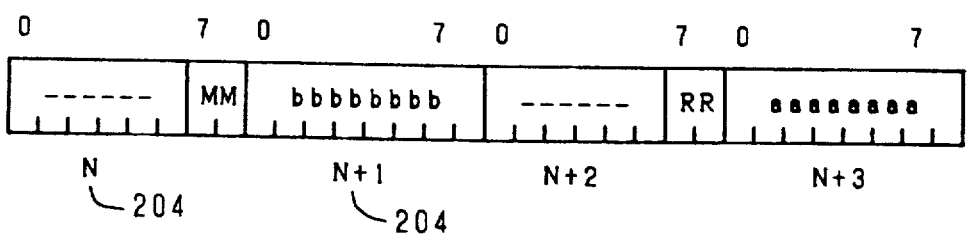
FIG. 2 is a schematic diagram showing a typical form of an instruction format of a data processor in accordance with the present invention.

In the format, as shown in FIG. 2, the right side 202 is the LSB side and is the high address. The instruction format can be discriminated only after an address N 204 and an address N+1 206 are checked. As described above, this is because of a premise that the instruction is fetched and decoded on a 16-bit (2-byte) unit basis without fail.

In the data processor of the present invention, in the case with any format, the extension part of Ea or Sh of each operand is sure to be positioned immediately after a half word comprising the basic part of that Ea or Sh. This takes precedence over the immediate value data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next instruction. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first word of instruction (including the basic part of Ea1), the expansion part of Ea1, the chained addressing mode extension part, the second half word of instruction (including the basic part of Ea2), the expansion part of Ea1 and the third half word of instruction.

(1.1) "Reduced-Type Two-Operand Instruction"

FIG. 3 through FIG. 6 are schematic diagrams showing reduced-type formats of the two-operand instruction.

Figure 3:
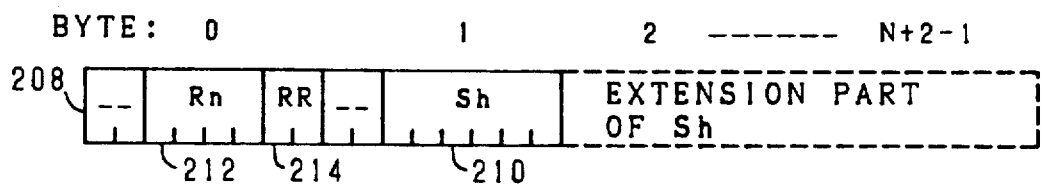
FIGS. 3, 4, 5, 6, 7, 8, 9, 10, and 11 are together various schematic diagrams showing an instruction format of short branch.

FIG. 3 is a schematic diagram showing a format 208 of an operational instruction between memory and register. This format includes a L-format wherein the source operand side is a memory and a S-format wherein the destination operand side is a memory.

In the L-format, Sh 210 represents the designating field of the source operand, Rn 212 represents the designating field of the register of the destination operand and RR 214 represents designating of the operand size of Sh, respectively. The size of the destination operand located in the register is fixed to 32 bits. Where the size of the register side differs from that of the memory side and the size of the source side is smaller, sign extension is performed.

In the S-format, Sh 210 represents the designating field of the destination operand, Rn 212 represents the register designating field of the source operand and RR 214 represents designating of the operand size of Sh, respectively. The size of the source operand located in the register is fixed to 32 bits. Where the size of the register side differs from that of the memory side and the size of the source side is larger, truncating of the overflow portion and overflow check are performed.

Figure 4:
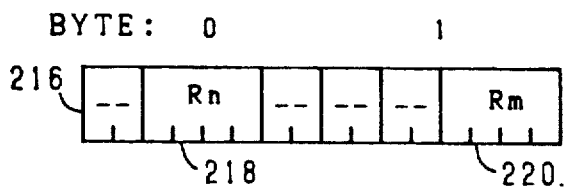

FIG. 4 is a schematic diagram showing a format 216 of an operational instruction between register and register (R-format). Rn 218 represents the designating field of the destination register, and Rm 220 represents the designating field of the source register. The operand size is 32 bits only.

Figure 5:
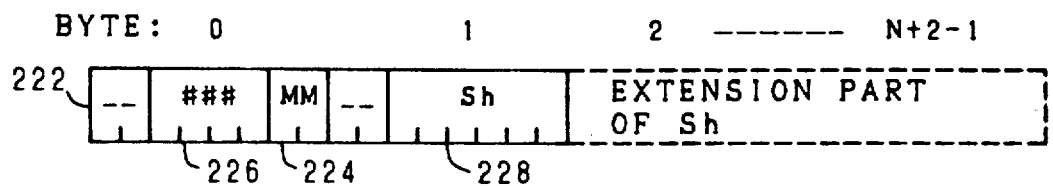

FIG. 5 is a schematic diagram showing a format 222 of an operational instruction between literal and memory (Q-format). MM 224 shows the designating field of the destination operand size, ###226 shows the designating field of the source operand by literal, and Sh 228 shows the designating field of the destination operand.

Figure 6:
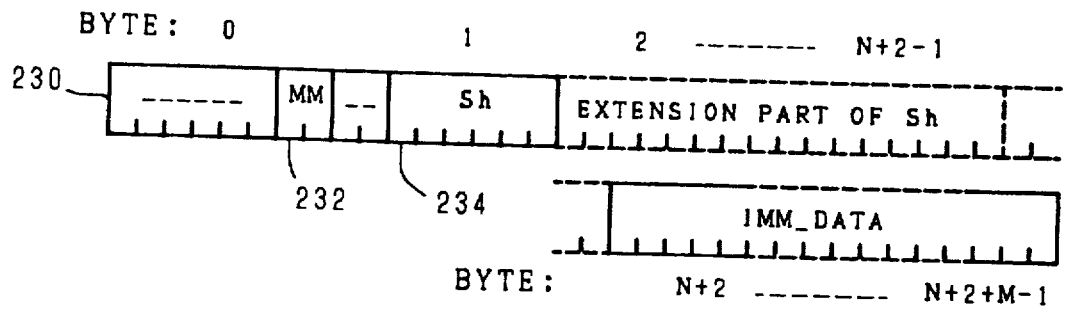

FIG. 6 is a schematic diagram showing a format 230 of an operational instruction between immediate value and memory (I-format). MM 232 represents the designating field of the operand size (common in source and destination), and Sh 234 represents the designating field of the destination operand. The sizes of the immediate value of the I-format are 8, 16 and 32 bits in common with the sizes of the operand of the destination side, and zero extension and sign extension are not performed.

(1.2) "General-Type One-Operand Instruction"

Figure 7:
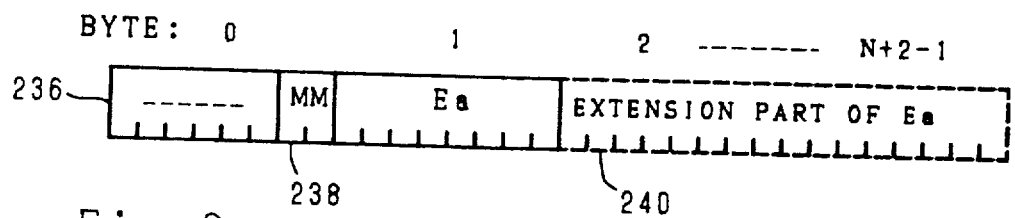

FIG. 7 is a schematic diagram showing a general-type format 236 of one-operand instruction (G1-format). MM 238 represents the designating field of the operand size. Some of the G1-format instructions comprise an extension part besides the extension part of Ea 240. There are also instructions using no MM.

(1.3) "General-Type Two-Operand Instruction"

Figure 8:
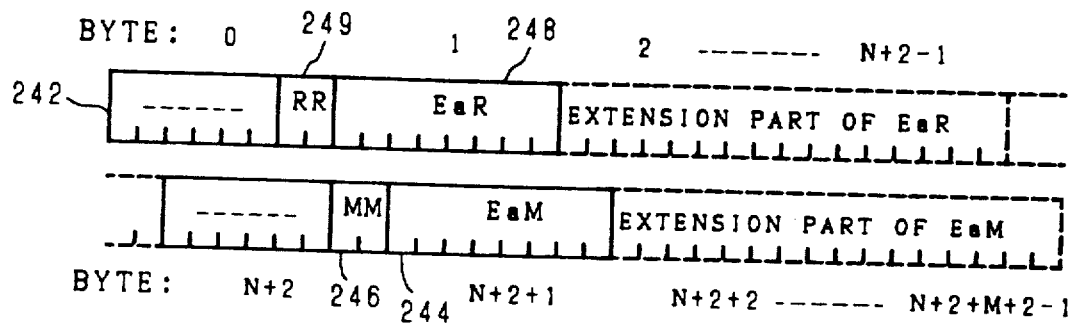
Figure 9:
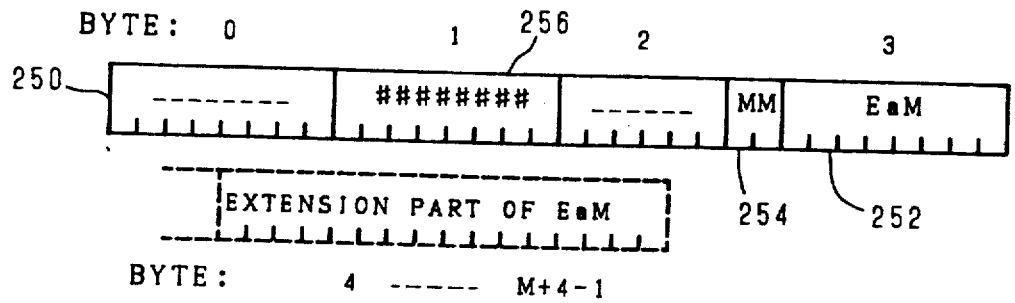
Figure 10:
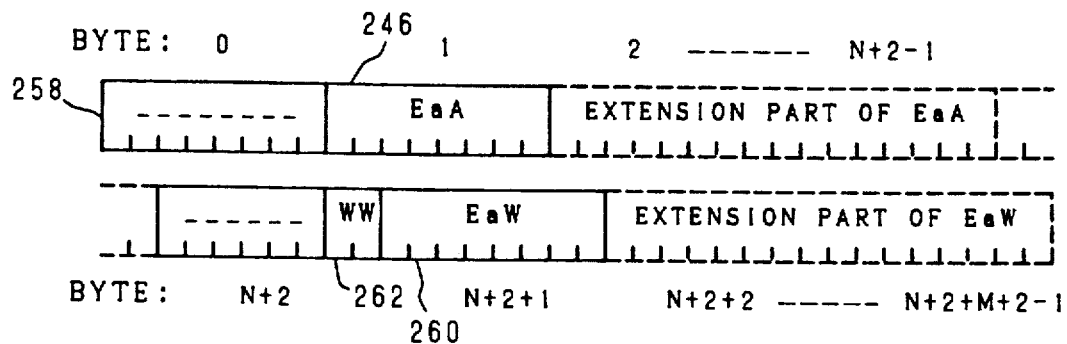

FIG. 8 through FIG. 10 are schematic diagrams showing general-type formats of two-operand instruction. This format comprises an instruction having a maximum of two operands of the general-type addressing mode which are designated by eight bits. There are cases where the total number itself of operands becomes three or more.

FIG. 8 is a schematic diagram showing a format 242 of an instruction wherein a first operand necessitates memory read-out (G-format). EaM 244 represents the designating field of the destination operand, MM 246 represents the designating field of the destination operand size, EaR 248 represents the designating field of the source operand, and RR 249 represents the designating field of the source operand size. Some of the G-format instructions comprise an extension part besides the extension part of EaR.

FIG. 9 is a schematic diagram showing a format 250 of an instruction wherein a first operand is an instruction of eight-bit immediate value (E-format). EAM 252 represents the designating field of the destination operand, MM 254 represents the designating field of the destination operand size, and ## ... 256 represents the source operand value.

The E-format and the I-format have similar functions, but their conceptions greatly differ from each other. Specifically, the E-format is coherently of a type derived from the general two-operand type (G-format), the size of the source operand is eight-bit fixed, and the size of the destination operand is selected from among 8, 16 and 32 bits. This means that the E-format presupposes an operation between different sizes, and the source operand of eight bits is zero-extended or code-extended in a manner agreeing with the size of the destination operand. On the other hand, the Iformat is of a type that the patterns of immediate value having high frequency, particularly in transfer instruction and comparison instruction, are shortened, and the sizes of the source operand and the destination operand are equal.

FIG. 10 is a schematic diagram showing a format 258 of an instruction wherein a first operand is only an address calculation. EaW 260 represents the designating field of the destination operand, WW 262 represents the designating field of the destination operand size, and EaA 264 represents the designating field of the source operand. For the source operand, the calculation result of an effective address is used.

Figure 11:
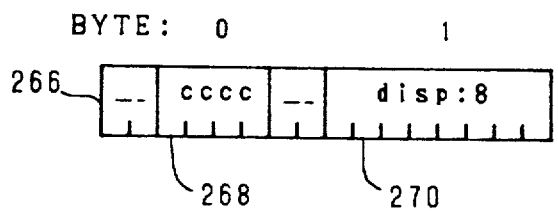

FIG. 11 is a schematic diagram showing a format 266 of a short branch instruction. The symbol cccc 268 represents the designating field of a branch condition, disp:8 270 represents the designating field of a displacement to a jump destination, and in the data processor of the present invention, when displacement is designated by eight bits, the displacement value is set by doubling the designated value in the bit pattern.

(1.4) "Addressing Mode"

The methods of designating the addressing mode of the data processor of the present invention include the reduced type designated by six bits including the register and the general type designated by eight bits.

Where an undefined addressing mode has been designated, or where a combination of addressing modes obviously unsuitable has been designated, a reserve instruction exception is generated; likewise, the case where an undefined instruction has been executed, and exception processing is started.

Equivalents to the above include the case where the destination is the immediate value mode and the case where the immediate value mode is used in the designating field of the addressing mode to be accompanied by address calculation.

Meanings of symbols used in the format diagram is as follows:

| | |
|---|---|
| Rn: | Register designating |
| mem [EA]: | Memory content of address as shown by EA |
| (Sh): | Designating method by the reduced-type addressing mode of six bits |
| (Ea): | Designating method by the general-type addressing mode of eight bits |

In the format diagram, the portion surrounded by a broken line shows the extension part.

(1.4.1) "Basic Addressing Nodes"

The data processor of the present invention supports various addressing modes. Among them, the basic addressing modes supported by the data processor of the present invention include a register direct mode, a register indirect mode, a register relative indirect mode, an immediate value mode, an absolute mode, a PC (Program Counter) relative indirect mode, a stack pop mode and a stack push mode.

Figure 12:
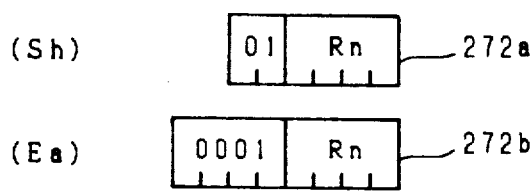
FIG. 12 is a schematic diagram showing an addressing mode of the data processor of the present invention.

The register direct mode takes the content of a register intact as an operand. FIG. 12 is a schematic diagram of the format thereof. Symbol Rn 272a, 272b shows the number of the general-purpose register.

Figure 13:
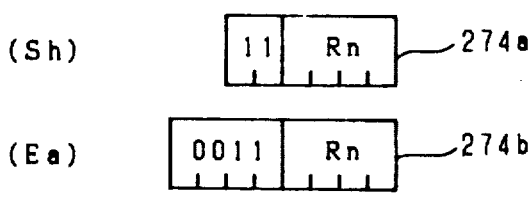
FIG. 13 is a schematic diagram showing an addressing mode of the data processor of the present invention.

The register indirect mode takes as an operand the content of the memory whose address is the content of a register. FIG. 13 is a schematic diagram of the format thereof. Symbol Rn 274a, 274b shows the number of the general-purpose register.

Figure 14:
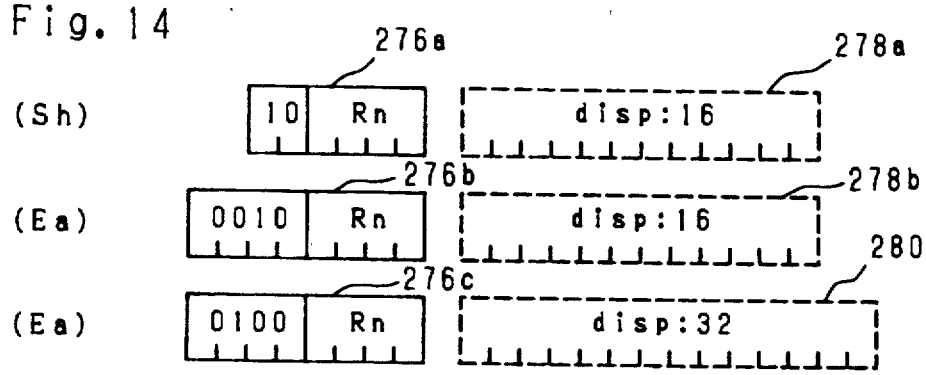
FIG. 14 is a schematic diagram showing an addressing mode of the data processor of the present invention.

The register relative indirect mode includes two kinds (16 bits and 32 bits) of the displacement value. Each of them takes as an operand the content of the memory whose address is the value of the content of the register added to the displacement value of 16 bits or 32 bits. FIG. 14 is a schematic diagram of the format thereof. Symbol Rn 276a, 276b, 276c shows the number of the general-purpose register. Symbols disp:16 278a, 278b and disp:32 280 show the displacement value of 16 bits and the displacement value of 32 bits, respectively. The displacement value is treated with a sign affixed.

Figure 15:
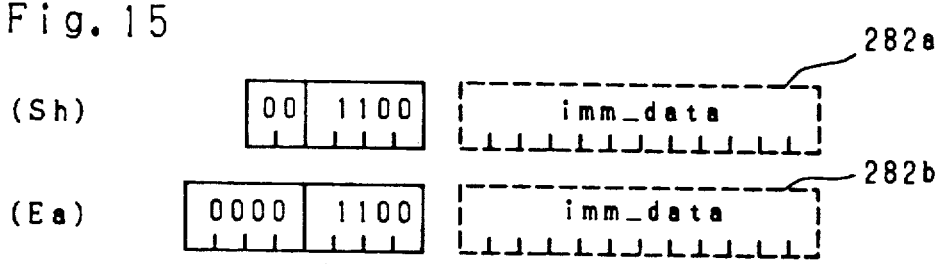
FIG. 15 is a schematic diagram showing an addressing mode of the data processor of the present invention.

The immediate value mode takes as an operand the bit pattern designated in the instruction code while assuming it intact as a binary number. FIG. 15 is a schematic diagram of the format thereof. Symbol imm_data 282a, 282b shows the immediate value. The size of imm_data is designated in the instruction as the operand size.

Figure 16:
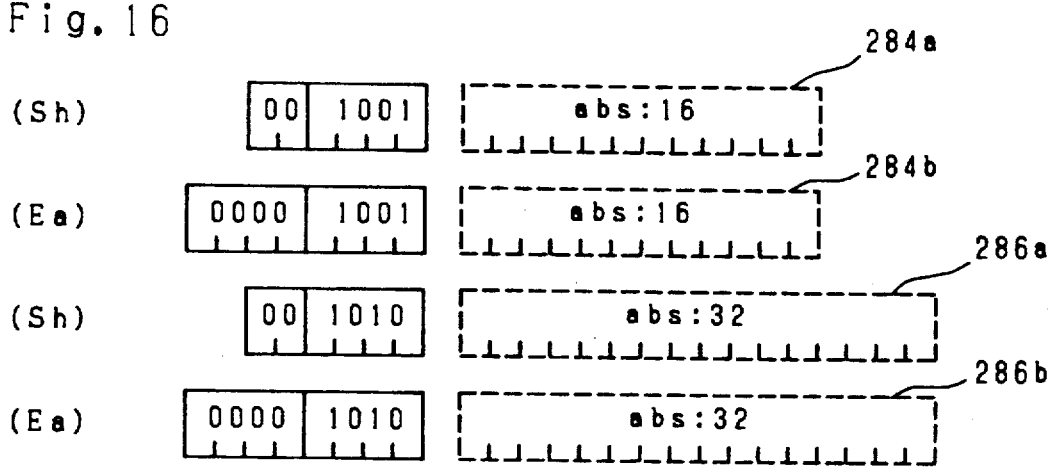
FIG. 16 is a schematic diagram showing an addressing mode of the data processor of the present invention.

The absolute mode includes two kinds of fields (16 bits and 32 bits) for showing the address value. Each kind takes as an operand the content of the memory whose address is the bit pattern of 16 bits or 32 bits designated in the instruction code. FIG. 16 is a schematic diagram showing the format thereof. Symbols abs:16 284a, 284b and abs:32 286a, 286b show the address values of 16 bits and 32 bits, respectively. When the address is shown by abs:16, the designated address value is code-extended to 32 bits.

Figure 17:
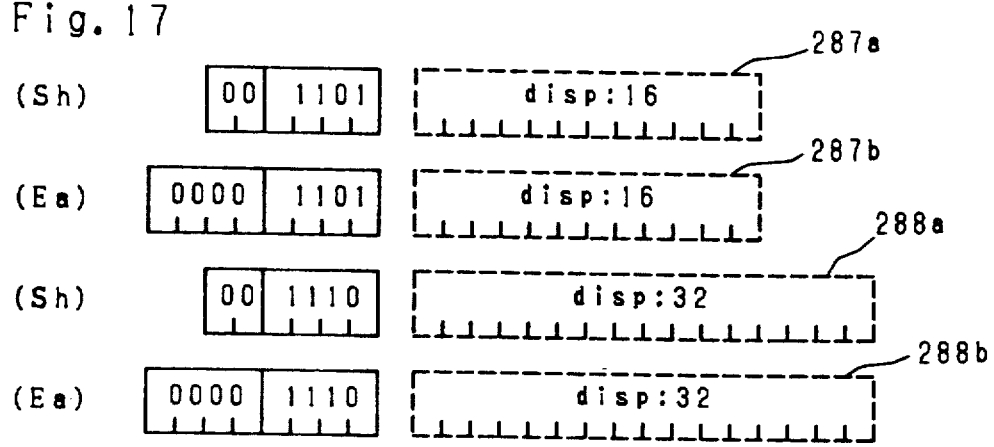
FIG. 17 is a schematic diagram showing an addressing mode of the data processor of the present invention.

The PC relative indirect mode includes two kinds of fields (16 bits and 32 bits) for the displacement value. Each takes as an operand the content of the memory whose address is the value of the content of a program counter whereto the displacement value of 16 bits or 32 bits is added. FIG. 17 is a schematic diagram showing the format thereof. Symbols disp:16 287a, 287b and disp:32 288a, 288b show the displacement value of 16 bits and the displacement value of 32 bits, respectively. The displacement value is treated with a sign affixed. In the PC relative indirect mode, the value of the program counter to be referenced is the head address of the instruction comprising the operand. Where the value of the program counter is referenced in the chained addressing mode, the head address of the instruction is also used as a reference value of PC relativity.

Figure 18:
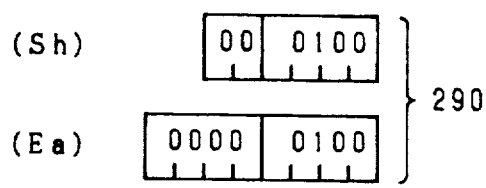
FIG. 18 is a schematic diagram showing an addressing mode of the data processor of the present invention.

The stack pop mode takes as an operand the content of the memory whose address is the content of a stack pointer (sP). After operand access, the stack pointer SP is incremented by the operand size. For example, where 32-bit data is handled, the SP is renewed (incremented) by +4 after the operand access. Designating the stack pop mode for operands of sizes of B and H can also be performed, and the stack pointer SP is renewed (incremented) by +1 and +2, respectively. FIG. 18 is a schematic diagram of the format 290 thereof. As to the one wherein the stack pop mode is invalid for the operand, a reserve instruction exception is generated. Specifically, a stack pop mode designating a write operand and a read-modify-write operand become reserve instruction exceptions.

Figure 19:
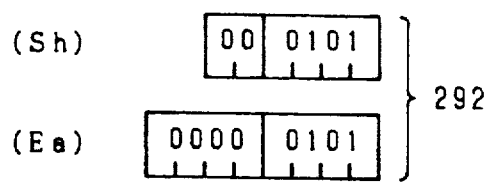
FIG. 19 is a schematic diagram showing an addressing mode of the data processor of the present invention.

The stack push mode takes as an operand the content of the memory whose address is the content of the stack pointer SP decremented by the operand size. In the stack push mode, the stack pointer SP is decremented before operand access. For example, when handling 32-bit data, the stack pointer SP is renewed (decremented) by −4 before operand access. It is also possible to designate the stack push mode for operands of sizes of B and H, and the stack pointer SP is renewed (decremented) by −1 and −2, respectively. FIG. 19 is a schematic diagram showing the format 292 thereof. As to the one wherein the stack push mode is invalid for the operand, a reserve instruction exception is generated. Specifically, a stack push mode designating a read operand and a read-modify-write operand become reserve instruction exceptions.

(1.4.2) "Chained Addressing Mode"

Addressing, however complicated, can basically be decomposed into combinations of addition and indirect reference. Accordingly, operations of addition and indirect reference are given in advance as primitives of addressing, and if they can be combined arbitrarily, any complicated addressing mode can be realized. The chained addressing mode of the data processor of the present invention is an addressing mode based on such a conception. A complicated addressing mode is particularly useful for data reference between modules or the processing system of an AI (Artificial Intelligence) language.

When designating the chained addressing mode, in the basic addressing mode designated field, one is designated from among three kinds of designating methods viz. a register base chained addressing mode, a PC base chained addressing mode and an absolute chained addressing mode.

Figure 20:
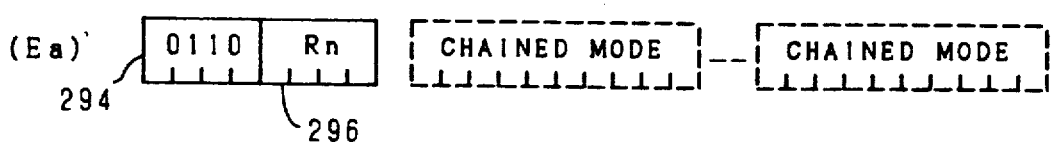
FIG. 20 is a schematic diagram showing an addressing mode of the data processor of the present invention.

The register base chained addressing mode is an addressing mode taking the value of register as the base value of the chained addressing to be extended. FIG. 20 is a schematic diagram showing the format 294 thereof. Symbol Rn 296 shows the number of the general-purpose register.

Figure 21:
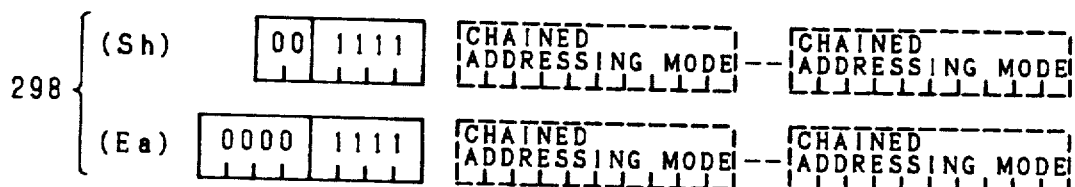
FIG. 21 is a schematic diagram showing an addressing mode of the data processor of the present invention.

The PC base chained mode is an addressing mode taking the value of the program counter (PC) as the base value of the chained addressing to be extended. FIG. 21 is a schematic diagram showing the format 298 thereof.

Figure 22:
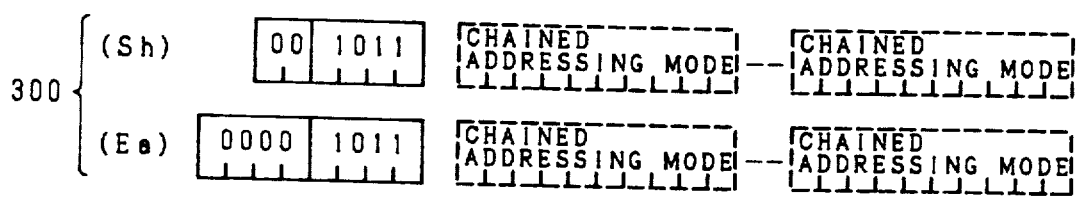
FIG. 22 is a schematic diagram showing an addressing mode of the data processor of the present invention.

The absolute base chained addressing mode is an addressing mode taking zero as the base value of the chained addressing to be extended. FIG. 22 is a schematic diagram of the format 300 thereof.

Figure 23:
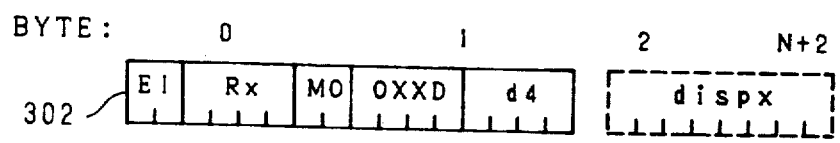
FIG. 23 is a schematic diagram showing an addressing mode of the data processor of the present invention.

The chained addressing mode designating field to be extended takes 16 bits as a unit, and this can be repeated a number of times. In each stage of the chained addressing mode, addition of displacement, scaling (×1, ×2, ×4, ×8) and addition of an index register, and indirect reference of memory are performed. FIG. 23 is a schematic diagram showing the format 302 of the chained addressing mode. Each field has meanings as shown below.

| | |
|---|---|
| E=0: | Continuation of the chained addressing mode is continued. |
| E=1: | Address calculation ends.<br>tmp → address of operand |
| I=0: | No memory indirect reference is performed.<br>tmp + disp + Rx * Scale → tmp |
| I=1: | Memory indirect reference is performed. |

|  | mem tmp + disp + Rx * Scale → tmp |
|---|---|
| M=0: | <Rx> is used as an index. |
| M=1: | Special index |
|  | <Rx> =0 Index value is not added. |
|  | (Rx = 0). |
|  | <Rx> = 1 Program counter is used as an index value. |
|  | (Rx = PC) |
|  | <Rx> = 2- Reserved. |
| D=0: | The value of field d4 of four bits in the chained addressing mode is quadrupled to be taken as a displacement value, and this value is added. The d4 is treated with a sign affixed, and is used by surely quadrupling it irrespective of the size of the operand. |
| D=1: | The dispx (16/32 bits) designated in the extension part of the chained addressing mode is taken as a displacement value, the size of the extension part whereto this value is added is designated in the d4 field. |
|  | d4 = 0001    dispx: 16 bits |
|  | d4 = 0010    dispx: 32 bits |
| XX: | Index scale (scale = 1/2/4/8) |

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 24:
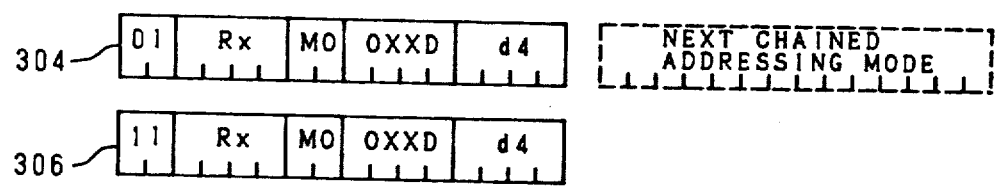
FIG. 24 is a schematic diagram showing an addressing mode of the data processor of the present invention.

FIG. 24 and FIG. 25 show variations on the instruction format formed by the chained addressing mode.

FIG. 24 shows variations of continuation 304 and completion of the chained addressing mode 306.

FIG. 25 shows variations 308a, 308b, 308c on the size of displacement.

If the chained addressing mode of up to an arbitrary number of stages can be utilized, case-sorting in the compiler, based on the number of stages, can be dispensed with, and therefore the advantage of alleviating the burden on the compiler is obtainable. This is because, even if frequency of chained reference is very low, the compiler has to be able to generate a correct code without fail. For this reason, up to an arbitrary number of stages can be applied in the format.

(1.5) "Exceptional Processing"

The data processor of the present invention has abundant exceptional processing functions for alleviating software load. In the data processor of this invention, there are three kinds of the exceptional processing, which are reexecution of instruction processing (named exception), completion of instruction processing (named trap) and interruption. In the data processor of the present invention, these three kinds of exceptional processings and system faults are generally called EIT.

(2) "Configuration of Function Block"

Figure 26A:
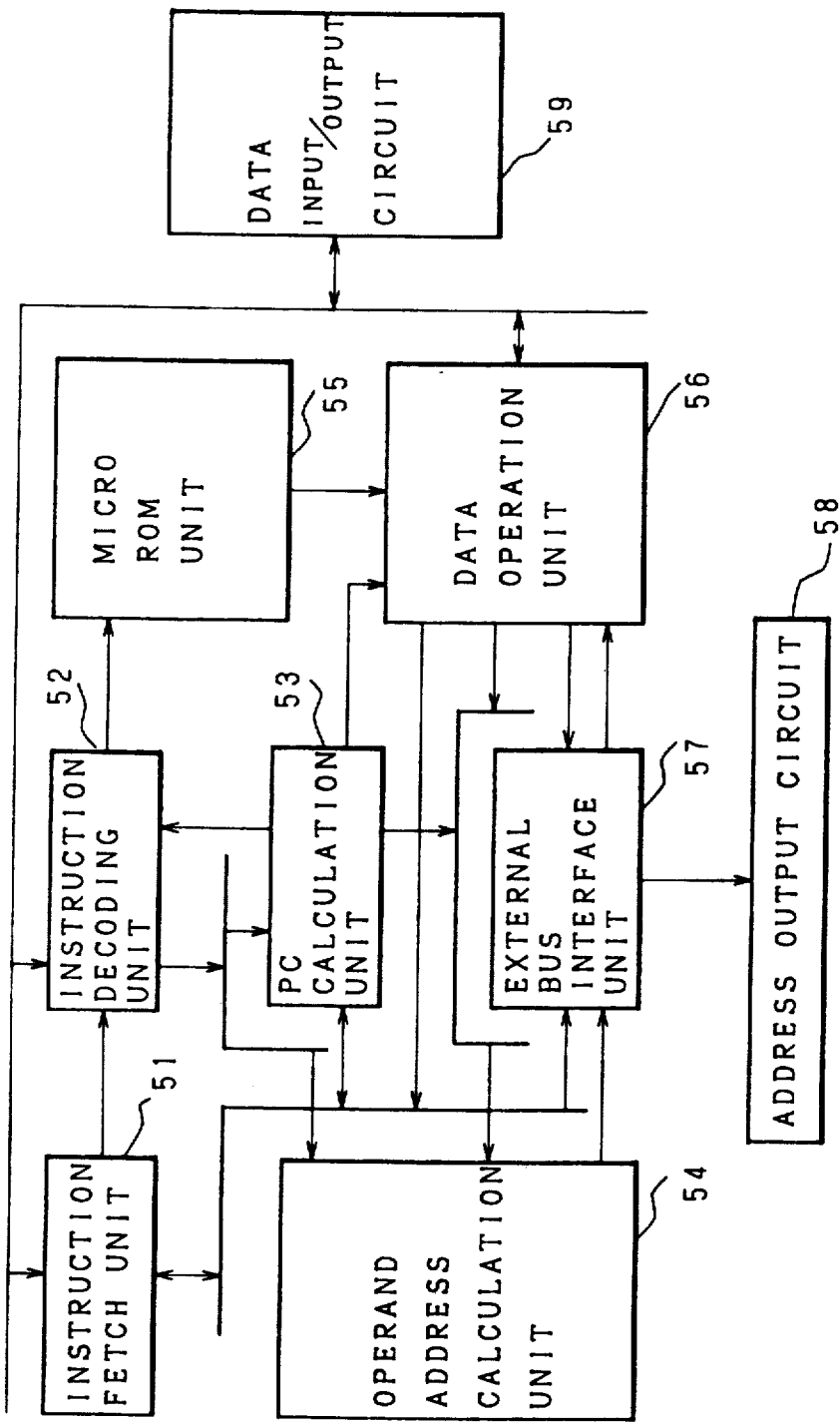
FIG. 26A is a block diagram showing a configuration of the data processor of the present invention.

FIG. 26A is a block diagram showing a configuration of the data processor of the present invention.

The interior of the data processor of the present invention is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 26A, in addition to the above-described units, an address output circuit 58 for outputting address to the exterior of a CPU and a data input/output circuit 59 for inputting and outputting data from and to the exterior of the CPU are shown being separated from the other function block units.

(2.1) "Instruction Fetch Unit"

The instruction fetch unit 51 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988) (incorporated herein by reference).

The address of an instruction to be fetched next is calculated by a dedicated counter as the address of the instruction to be inputted to an instruction queue. In the case where a branch or jump is generated, an address of a new instruction is transferred from the PC calculation unit 53 or the data operation unit 56.

In the case where an instruction is fetched from a memory outside the CPU, the address of the instruction to be fetched is outputted from the address output circuit 58 to the outside of the CPU through the external bus interface unit 57, and an instruction code is fetched from the data input/output circuit 59. Then, among the instruction codes in buffering, the instruction code to be decoded next is outputted to the instruction decoding unit 52.

(2.2) "Instruction Decoding Unit"

Figure 30:
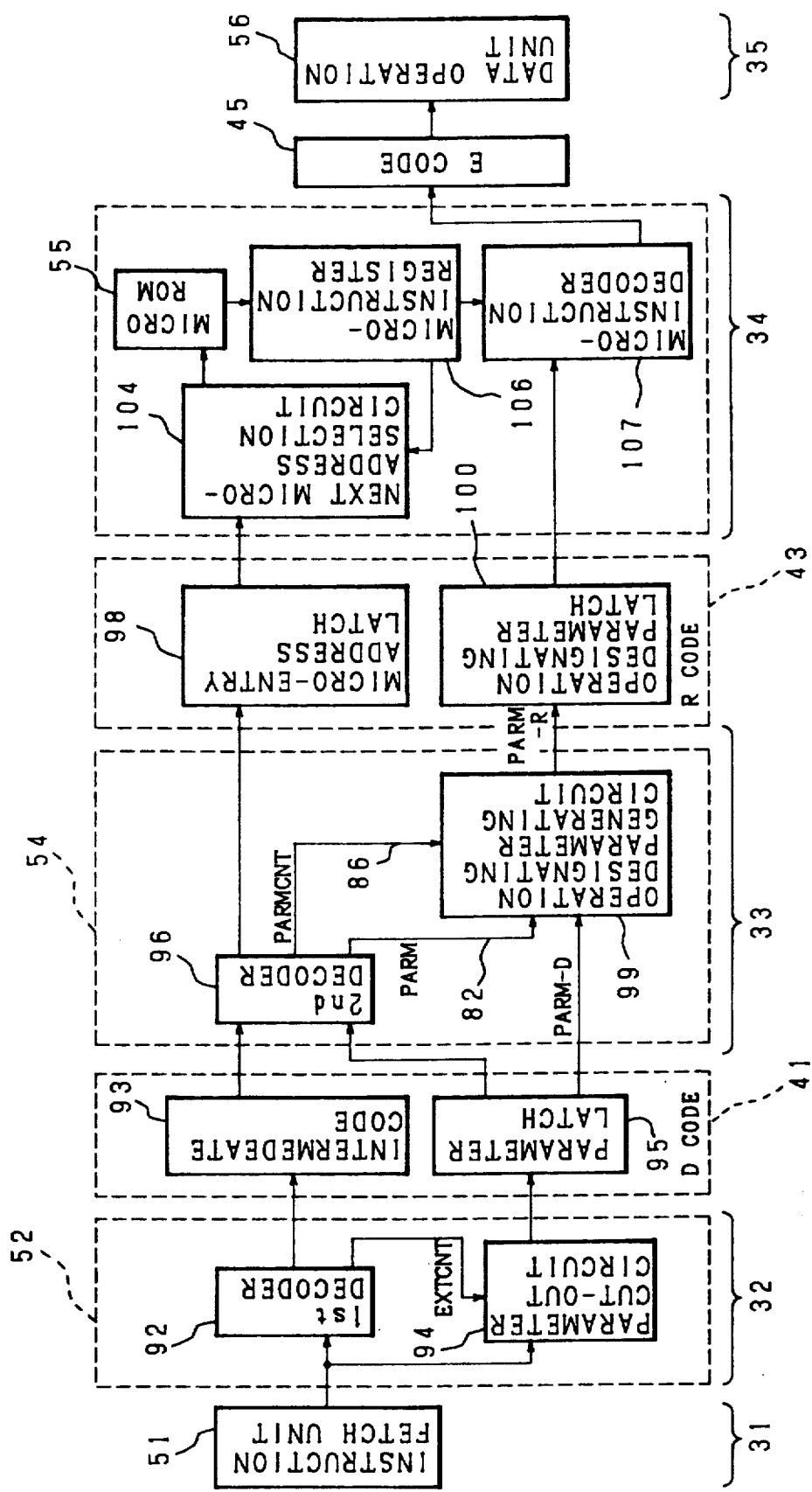

In the instruction decoding unit 52, basically an instruction code is decoded on a 16-bit (half word) basis. This block comprises a FHW decoder for decoding an operation code included in the first half word (FHW), a NFHW (Not first half word) decoder for decoding an operation code including in the second and the third half words, and an addressing mode decoder for decoding an addressing mode. These FHW decoder, NFHW decoder and addressing mode decoder are generally called a first decoder 92 (FIG. 30).

There are also a second decoder 96 (FIG. 30) which further decodes an output of the FHW decoder and the NFHW decoder and calculates an entry address of the micro RON, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0–6 bytes per two clocks (one step). Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

(2.3) "Micro ROM Unit"

The micro ROM unit 55 comprises a micro ROM for storing microprograms which mainly control the data operation unit 56, a micro sequencer, and a micro instruction decoder. A micro instruction is read out from the micro ROM once per two clocks (one step). The micro sequencer accepts processings of exception, interruption and trap (these three are generally called EIT) in a hardware manner in addition to the sequential processings shown by the microprograms. The micro ROM unit 55 also controls a store buffer. To the micro ROM unit 55, there are inputted flag information generated by interruption independent of the instruction code or by the result of operation execution, and output of an instruction decoding unit such as the output of a second decoder 96 (FIG. 30). Output of the micro decoder is mainly performed to the data operation unit 56, but some information such as information for stopping other preceding processing due to execution of a jump instruction is outputted also to other blocks.

(2.4) "Operand Address Calculation Unit"

The operand address calculation unit 54 is controlled in a hardwired manner by information on operand address calculation outputted from the address decoder of the instruction decoding unit 52 or the like. In this block, substantially all processing on operand address calculations is performed. Checking is conducted to determine whether or not the address of memory access for memory indirect addressing and the operand address can be entered in an I/O area mapped in the memory.

The result of address calculation is sent to the external bus interface unit 57. The values of the general-purpose register and the program counter required for address calculation are inputted from the data operation unit.

In performing memory indirect addressing, the memory address to be referenced is output from the address output circuit 58 to the outside of the CPU through the external bus interface unit 57, and the indirect address value input from the data input/output unit 59 is fetched through the instruction decoding unit 52.

(2.5) "PC Calculation Unit"

The PC calculation unit 53 is controlled in a hardwired manner using information on PC calculation outputted from the instruction decoding unit 52. The PC calculation unit 53 calculates the PC value of an instruction. The data processor of the present invention has a variable-length instruction set, and the length of that instruction can be found only after the instruction is decoded. For this reason, the PC calculation unit 53 generates the PC value of the next instruction by adding the length of the instruction output from the instruction decoding unit 52 to the PC value of the instruction in decoding. In the case where the instruction decoding unit 52 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

A detailed description of this pre-branch approach is provided in Japanese Patent Application Laid-Open NO. 63-59630 (1988) and the Japanese Patent Application Laid-Open No. 63-55639 (1988)(incorporated herein by reference).

The result of calculation in the PC calculation unit 53 is outputted as the PC value of each instruction together with the result of decoding of the instruction, and in addition, is outputted to the instruction fetch unit 51 as the address of the instruction to be decoded next at prebranch. Also, it is used for the address for branch prediction of the instruction to be decoded next in the instruction decoding unit 52.

A detailed description of the branch predicting approachis provided in Japanese Patent Application Laid-Open No. 63-175934 (1988)(incorporated herein by reference).

(2.6) "Data Operation Unit"

The data operation unit 56 is controlled by microprograms, and executes the operation required for realizing the function of each instruction by means of registers and an arithmetic unit according to output information of the micro ROMunit 55. In the case where the operand to be operated on is an address or an immediate value, the address or the immediate value calculated in the operand address calculation unit 54 is obtained by passing it through the external bus interface unit 57. The external bus interface unit 57 provides correspondence of various control signals. In the case where the operand to be operated on is in a memory outside the CPU, the bus interface unit outputs the address calculated in the address calculation unit 54 from the address output circuit 58, and the operand fetched from the memory or cache 434 outside the CPU is obtained, using an external data bus 441 (FIG. 26B), through the data input-/output circuit 59.

Arithmetic units include an ALU, a barrel shifter, a priority encoder, a counter, and a shift register. The registers and the main arithmetic units are connected through three buses. One micro instruction for directing operation between registers is processed in two clocks (one step).

In the case where an access to memory outside the CPU is required in a data operation, the address is output from the address output circuit 58 to the outside of the CPU through the external bus interface unit 57 by the direction of the microprogram, and the target data is fetched through the data input/output circuit 59.

In the case where data is stored in memory outside the CPU, the address is output from the address output circuit 58 through the external bus interface unit 57, and simultaneously the data is outputted from the data input/output circuit 59 to components outside of the CPU. In order to efficiently perform an operand store, a four-byte store buffer is installed in the data operation unit 56.

In the case where the data operation unit 56 obtains a new instruction address by processing a jump instruction or an exceptional processing, this is outputted to the instruction fetch unit 51 and the PC calculation unit 53.

Figure 26B:
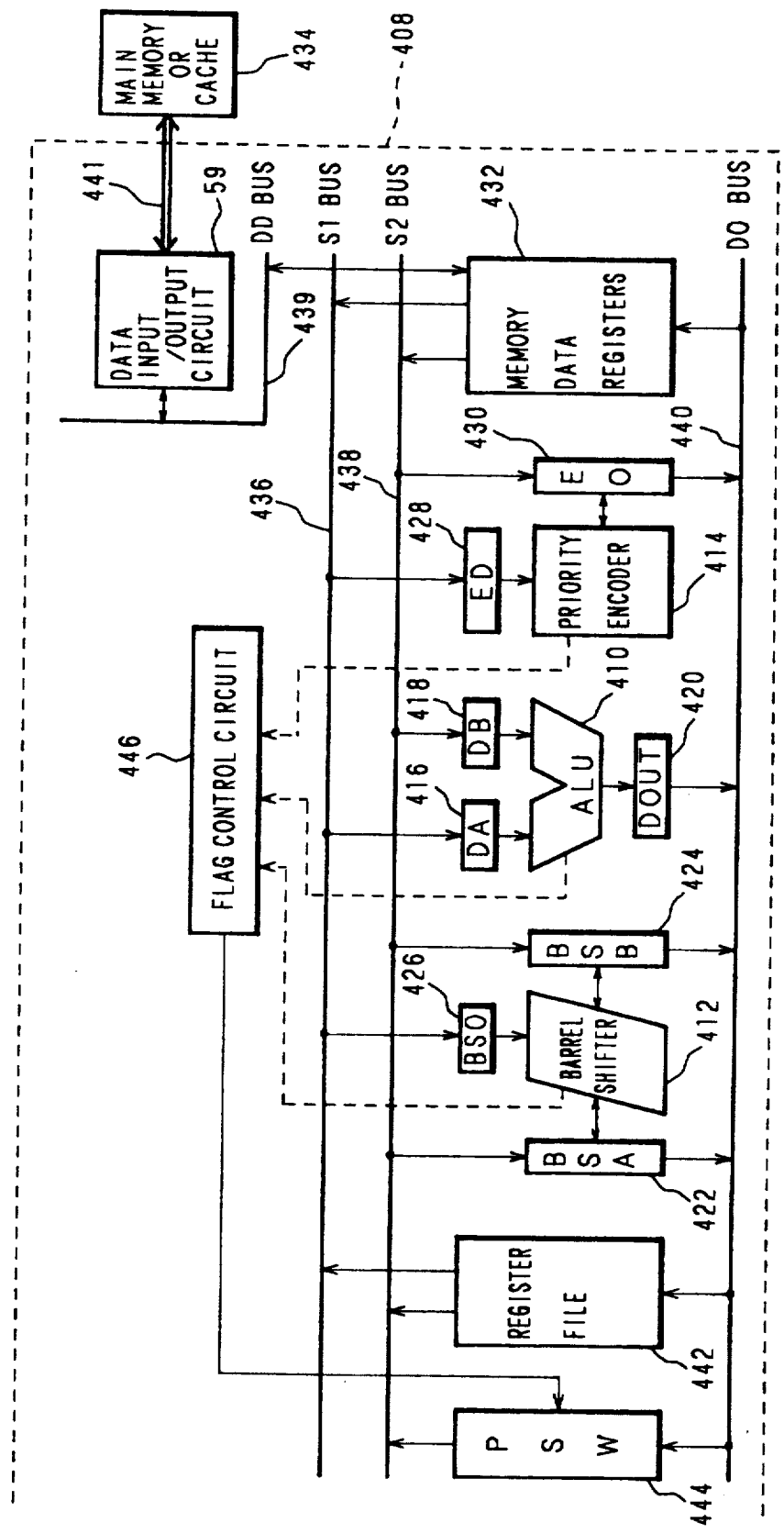
FIG. 26B is a block diagram showing components of a data operation unit, according to the present invention.

FIG. 26B depicts the various components of the data operation unit 56 of the processor 408. The operating components include an arithmatic logic unit (ALU) 410, a barrel shifter 412, and a priority encoder 414. The ALU 410 has two input latches, designated "DA" 416 and "DB" 418. The ALU has an output latch, designated "DOUT" 420. Shift data for the barrel shifter 412 is held in two latches, designated "BSA" 422 and "BSB" 424. Additionally, a third latch, designated "BSO" 426, is provided for holding the number of bits which are shifted by the barrel shifter. The priority encoder 414 is coupled to a first latch, designated "ED" 428, for holding data being searched by the priority encoder. A second latch, designated "EO" 430, is coupled to the priority encoder 414 and stores a bit offset, indicating the position to start searching by the priority encoder or for holding the bit offset as a result of searching. A memory data register 432 is provided for holding data being fetched from a memory 434, as well as for holding data to be written into the memory 434. Addresses to be output to the memory 434 are provided by the address output circuit 58 (FIG. 26A). Four internal buses are included, designated "S1 bus" 436, "S2 bus" 438, "DD bus" 439, and "DO bus" 440. As described below, these internal buses are used for sending information from the register file 442 or memory data register 434 to the operation components 410, 412, 414 or the data I/O circuit 59. A processor status word (PSW) register 444 is used to store various flags, indicating aspects of the result of the operation. A flag control circuit 446 controls renewal of the flags in the PSW 444.

In normal processing, operand values are read-out from the register file 442 or the memory data register 432, and inputted into the operation components 410, 412, 414 through the S1 bus 436 and the S2 bus 438. A specified operation (as described below) is conducted in the operation components 410, 412, 414, and the result of such operation is stored in the register file 442 or memory data register 432, using the DO bus 440. Flag information related to the result of the operation, such as a zero flag or an overflow flag from the ALU 410, is inputted to the flag control circuit 446. In the flag control circuit 446, control signals which control whether to renew flags in the PSW 444 are provided. In cases in which PSW flags are to be renewed, signals indicating which flag information is to be renewed are provided. In this case, the flag control circuit 446 also determines from which operation component 410, 412, 414 the flag information is to be derived. The signals from the flag control circuit 446 are then used to control renewal of the flags in the PSW 444.

(2.7) "External Bus Interface Unit"

The external bus interface unit 57 controls communication through the external bus of the data processor of the present invention. All accesses to memories are performed in a clock-synchronized manner, and can be performed in a minimum of two clock cycles (one step).

Access requests to memory are generated independently from the instruction fetch unit 51, the operand address calculation unit 54 and the data operation unit 56. The external bus interface unit 57 mediates these memory access requests. Furthermore, access to data located at misaligned words, i.e., memory addresses which involve striding over the word boundary of 32 bits (one word) which is the size of the data bus connecting the memory to the CPU is performed in such a manner that striding over the word boundary is automatically detected in this block and the access is decomposed into memory accesses over two steps.

This unit also performs conflict preventing processing and by-pass processing from the store operand to the fetch operand in the case where the operand to be prefetched and the operand to be stored are superposed.

(3) "Pipeline Processing Mechanism"

Figure 27:
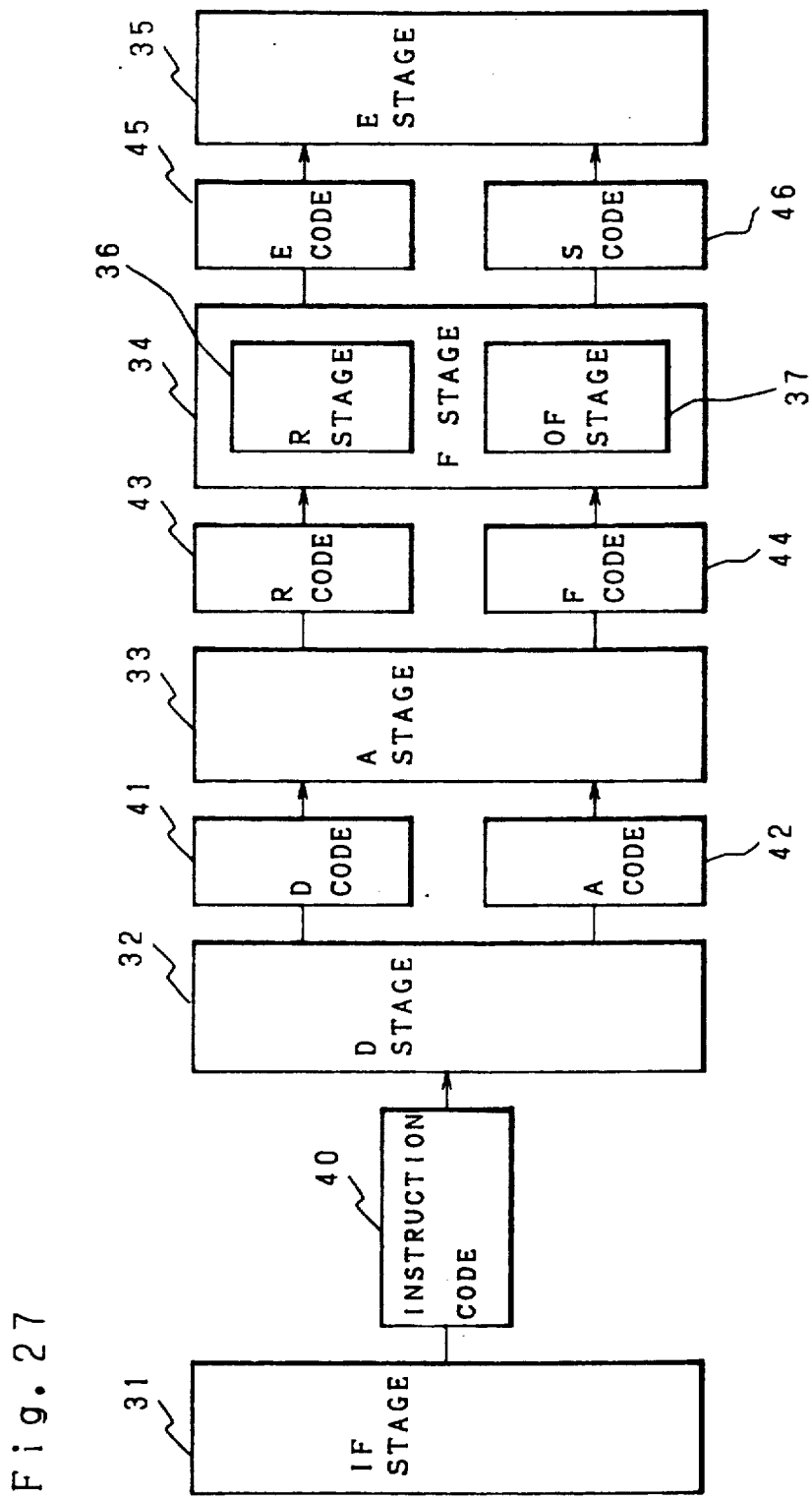
FIG. 27 is a block diagram showing a configuration of a pipeline function of the data processor of the present invention.

FIG. 27 is a schematic diagram showing a pipeline processing mechanism of the data processor of the present invention.

The basis of pipeline processing has a five-stage configuration which comprises an instruction fetch stage (IF stage) 31 for prefetching an instruction, a decoding stage (D stage) 32 for decoding the instruction, an operand address calculation stage (A stage) 33 for performing address calculation of an operand, an operand fetch stage (F stage) 34 consisting of a portion for performing micro ROM access (particularly called a R stage 36) and a portion for prefetch an operand (particularly called an OF stage 37), and an execution stage (E stage) 35 for executing an instruction.

The E stage 35 comprises a one-stage store buffer, and besides, in some high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clock cycles (one step). Accordingly, ideally, the pipeline processing progresses one after another on a two clock cycle (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For an instruction having a plurality of memory operands, pipeline processing is performed based on the number of memory operands by decomposing it into a plurality of pipeline processing units (step code) at the decoding stage.

A detailed description of the decomposing method of the pipeline processing unit is provided in Japanese Patent Application Laid-Open No. 63-89932 (1988) (incorporated herein by reference).

Information transferred from the IF stage 31 to the D stage 32 is an instruction code 40 itself. Information transferred from the D stage 32 to the A stage 33 includes two kinds of information, one for an operation designated by an instruction (called a D code 41) and the otherfor address calculation of an operand (called an A code 42).

Information transferred from the A stage 33 to the F stage 34 includes an R code 43 comprising an entry address of a microprogram or a parameter of the microprogram and an F code 44 comprising an operand address and information on directing the method of access.

Information transferred from the F stage 34 to the E stage 35 is an E code 45 comprising operation control information and literal and an S code 46 comprising an operand or an operand address.

EIT detected in the stage other than the E stage 35 does not start the EIT processing until the code thereof reaches the E stage 35. This is because only the instruction processed in the E stage 35 is an instruction at the step of execution, and the instructions having been processed between the IF stage 31 and the F stage 34 do not reach the step of execution yet. Accordingly, for an EIT detected in a stage other than the E stage 35, the detection thereof is recorded in the step code, and it is only transmitted to the following stage.

(3.1) "Pipeline Processing Unit"

(3.1.1) "Classification of Instruction Code Fields"

The pipeline processing unit of the data processor of the present invention is determined by utilizing the feature of the format of an instruction set.

As described in Section (1), the instruction of the data processor of the present invention is a variable-length instruction of two-byte unit, and basically the instruction is configurated by repeating one to three times "a two-byte instruction base part + an addressing extension part of 0 to 4 bytes".

In many cases, the instruction base part comprises an operation code part and an addressing mode designating part, and in the case where index addressing or memory indirect addressing is required, "a two-byte chained addressing mode designating part + an addressing extension part of 0 to 4 bytes" is affixed by an arbitrary number in place of the addressing extension part. The extension part of two or four bytes which is peculiar to the instruction is also affixed lastly depending on the instruction.

The instruction base part comprises an operation code of an instruction, a basic addressing mode, literal and the like. The addressing extension part is any one of a displacement, an absolute address, an immediate value and a displacement of branch instruction. The extension part peculiar to the instruction comprises a register map, an immediate value designating of the I-format instruction and the like.

FIG. 28 is a schematic diagram showing the feature of the basic instruction format 310 of the data processor of the present invention.

(3.1.2.) "Decomposition of Instruction into Step Codes"

The data processor of the present invention performs pipeline processing making the most of the feature of the above-mentioned instruction format.

In the D stage 32, "a two-byte instruction base part + an addressing extension part of 0 to 4 bytes," "a chained addressing mode designating part + an addressing extension part," or an extension part peculiar to the instruction is processed as one decoding unit. The result of decoding of each time is called a step code. In and after the A stage 33, this step code is taken as a unit of pipeline processing. The number of step codes is peculiar to each instruction. In the case where chained addressing mode designating is not performed, one instruction is divided into a minimum of one step code to a maximum of three step codes. In the case where chained addressing mode designating is performed, the number of step codes is increased by a number as required. Note that this is performed only in the decoding step as described later.

(3.1.3) "Control of Program Counter"

All of the step codes existing on the pipeline of the data processor of the present invention have a possibility of being for another instruction, and for this reason, the value of the program counter is controlled on a step code basis. All of the step codes have a program counter value of the instruction whereon that step code is based. The program counter value flowing through each stage of the pipeline while accompanying the step code is called a step program counter (SPC). The SPC is transferred sequentially from one pipeline stage to the other.

(3.2) "Processing of Each Pipeline Stage"

As shown in FIG. 27, for the sake of convenience, names are given to the input and output step codes of each pipeline stage. The step codes perform processing relating to the operation codes, and include two series; a series becoming the entry addresses of microprograms and parameters for the E stage 35 and a series becoming operands for microinstructions of the E stage 35.

(3.2.1) "Instruction Fetch Stage"

The instruction fetch stage (IF stage) 31 fetches an instruction from the memory or the branch buffer, inputs it to the instruction queue, and outputs an instruction code to the D stage 32. Input of the instruction queue is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue is variable on a two-byte basis, and a maximum of six bytes can be outputted during two clocks. Immediately after a branch, two bytes of the instruction base part can also be transferred directly to the instruction decoder by by-passing the instruction queue Control of registering, clearing and the like of the instruction to the branch buffer, management of addresses of the instructions to be prefetched and control of the instruction queue are also performed in the IF stage 31.

The EITs detected in the IF stage 31 include a bus access exception in fetching an instruction from the memory or an address conversion exception due to memory protection violation.

(3.2.2) "Instruction Decoding Stage"

The instruction decoding stage (D stage) 32 decodes an instruction code inputted from the IF stage 31. Decoding is performed on a two clock cycle (one step) basis using the first decoder 92 (FIG. 30) consisting of the FHW decoder, the NFHW decoder and the addressing mode decoder in the instruction decoding unit 52. An instruction code of 0 to 6 bytes is consumed in the decoding processing during one operation thereof (no instruction code is consumed in the outputting processing of the step code comprising the return address of the RET instruction). During one operation of the decoding unit, the control code which is the A code 42 as address calculation information, address modification information, the control code which is the D code 41 as the result of intermediate decoding of the operation code, and eight-bit literal information are inputted to the A stage 33.

In the D stage 32, control of the PC calculation unit 53 of each instruction, branch prediction processing, prebranch processing for the pre-branch instruction and outputting processing of the instruction code from the instruction queue are also performed.

The EITs detected in the D stage 32 include a reserve instruction exception and an odd address jump trap at prebranch. Various EITs transferred from the IF stage 31 are also transferred to the A stage 33 through processing of encoding into the step code.

(3.2.3) "Operand Address Calculation Stage"

Processing functions or the operand address calculation stage (A stage) are roughly divided into two parts. One is processing for post-decoding of the operation code using the second decoder96 (FIG. 30) of the instruction decoding unit 52 and the other is for calculation of an operand address in the operand address calculation unit 54. The post-decoding processing of the operation code inputs the D code 41 and outputs the R code 43 comprising a write reserve of register and memory, an entry address of a microprogram and parameters for the microprogram. In addition, the write reserve of the register or memory is for preventing a wrong address calculation by re-writing the content of the register or memory referenced in the address calculation with the instruction preceding on the pipeline.

To avoid a dead lock, the write reserve of the register or memory is performed on an instruction basis rather than on a step code basis.

A detailed description of the write reserve to the register or memory is provided in Japanese Patent Application No. 62-144394 (1987) (incorporated herein by reference).

The operand address calculation processing inputs the A code 42, performs addition in the operand address calculation unit 54 according to the A code 42 or performs address calculation by combining memory indirect reference, and outputs the result of the calculation as the F code 215. At this time, a conflict check is done in reading-out of the register and the memory attending on the address calculation. If a conflict is indicated because the preceding instruction has not completed the writing processing to the register or the memory, the processing waits until the preceding instruction completes the write processing in the E stage 35. A check is done for whether or not the operand address and the address of memory indirect reference can enter the I/O area mapped in the memory.

The EITs detected in the A stage 33 include the reserve instruction exception, privilege instruction exception, bus access exception, address conversion exception and debugging trap generated by an operand break point hit at memory indirect addressing. When it is indicated that the D code 41 or the A code 42 itself has caused EIT, the A stage 33 does not perform address calculation processing for that code, and that EIT is transmitted to the R code 43 and the F code 44.

(3.2.4) "Micro ROM Access Stage"

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the first micro ROM is used in the E stage 35, and the following R code 43 waits for micro ROM access. Micro ROM access using the R code 43 is performed when the last micro instruction is executed in the preceding E stage 35. In the data processor of the present invention, almost all of the basic instructions are executed in one microprogram step, therefore, there are many actual cases in which micro ROM accesses to the R code 43 are performed one after another.

There is no EIT to be detected anew in the R stage 36. When the R code 43 indicates the EIT of instruction processing re-execution type, the microprogram for that EIT processing is executed, and therefore the R stage 36 fetches the micro instruction according to the R code 43. In case where the R code 43 indicates an odd address jump trap, the R stage 36 transmits it through the E code 45. This is for pre-branch, and in the E stage 35, if no branch is made in that E code 45, an odd address jump trap is generated with the pre-branch being effective.

(3.2.5) "Operand Fetch Stage"

The operand fetch stage (OF stage) 37 performs operand prefetch processing among the above-mentioned two processings performed in the F stage 34.

Operand prefetch processing inputs the F code 44 and outputs the fetched operand and the address thereof as the S code 46. One F code 44 may stride over the word boundary, but it designates operand fetching of four bytes or less. The F code 44 also comprises a designation of whether or not access to the operand is to be performed. In the case where the operand address itself or the immediate value calculated in the A stage 33 is transferred to the E stage 35, no operand prefetch is performed, and the content of the F code 44 is transferred as the S code 46. In the case where the operand intended to be prefetched coincides with the operand intended to be write-processed in the E stage 35, no operand prefetching is performed from the memory, but operation of the pre-fetch is performed by by-passing it. For the I/O area, the operand prefetch is delayed, and the operand fetch is performed only after all the preceding instructions have been completed.

The EITs detected in the OF stage 37 include a bus access exception, an address conversion exception, and a debugging trap generated by a break point hit to the operand prefetch. When the F code 44 indicates an EIT other than the debugging trap, it is transferred to the S code 46, and no operand prefetch is performed. When the F code 44 indicates a debugging trap, the same processing as the case where no EIF is indicated for that F code 44 is performed, and the debugging trap is transmitted to the S code 46.

(3.2.6) "Execution Stage"

The execution stage (E stage) 35 operates with the E code 45 and the S code 46 taken as inputs. This E stage 35 is a stage for executing instructions, and all processing performed in the stages before and in the F stage 34 are preprocessings for the E stage 35. In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of a microprogram indicated in the R code 43.

Reading of the micro ROM and execution of the microinstruction are performed in a pipeline manner. Accordingly, in the case where a branch takes place in the microprogram, a gap (blank) of one micro-step is generated. The E stage 35 can also perform pipeline processing of an operand store of four bytes or less and the following microinstruction execution by utilizing the store buffer in the data operation unit 56.

In the E stage 35, the write reserve to the register and the memory performed in the A stage 33 are released after write of the operand.

In the case where a conditional branch instruction generates a branch in the E stage 35, the branch prediction for that conditional branch instruction has been wrong, and therefore rewriting of the branch history is performed.

The EITs detected in the E stage 35 include the bus access exception, address conversion exception, debugging trap, odd address jump trap, reserve function exception, wrong operand exception, reserve stack format exception, zero division trap, unconditional trap, conditional trap, delayed context trap, external interruption, delayed interruption, reset interruption and system faults.

The EITs detected in the E stage 35 are all EIT-processed, but the EITs which are detected between the IF stage 31 and the F stage 34 before the E stage and are reflected in the R code 43 or the S code 46 are not necessarily EIT-processed. All the EITs which are detected among from the IF stage 31 to the F stage 34, but do not reach the E stage 35 because the preceding instruction has executed a jump instruction in the E stage 35 or the like are canceled. The instruction having caused that EIT is assumed to have not been executed from the beginning.

The external interruption and the delayed interruption are accepted directly to the E stage 35 at a pause of the instruction, and necessary processing is executed by microprograms. Processings of other various EITs are performed by microprograms.

(3.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in a waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or a wait is inserted into the memory access under processing, or another pipeline conflict occurs, the processing itself of each stage is delayed.

(4) "Parameter Generating Processing"

Description is made hereinafter on how a parameter which designates operation of the ALU, the barrel shifter or the like or designates mask of flags (hereinafter referred to as an operation designating parameter) is generated and given to the data operation unit 56 being an instruction executing means in the data processor in accordance with the present invention.

FIG. 29 shows information on parameters and flags to be masked and the content of operation for each ALU operation instruction of MOV 312, ADD 314, SUB 316, AND 318, OR 320, and XOR 322 as an example among an instruction set of the data processor of the present invention.

These instructions are processed by the same microinstruction, and detailed direction of operation is performed by operation designating parameters. In addition, in FIG. 29, "*" represents "Don't Care," "m" represents mask (note that the flag doesn't change), a flag F represents "general," a flag X represents "carry," a flag V represents "overflow," a flag L represents "low," a flag M represents "MSB" and a flag Z represents "zero," respectively.

FIG. 30 is a block diagram showing a further detailed configuration of the data processor of the present invention.

In FIG. 30, numeral 51 designates the instruction fetch unit, which is constituted concretely with an instruction queue and is equivalent to the IF stage 31 in FIG. 7.

Numeral 92 designates a first decoder constituted with a PLA (Programmable Logic Array) for decoding an instruction. The first decoder 92 decodes the instruction code given from the instruction fetch unit 51, and generates an intermediate code 93 constituting the D code 41, and outputs a parameter cut-out control signal EXTCNT given to a parameter cut-out circuit 94.

The parameter cut-out circuit 94 is given part of the instruction from the instruction fetch unit 51, and cuts out a parameter (the second bit field) from this according to the parameter cut-out control signal EXTCNT given from the first decoder 92.

In addition, the instruction decoding unit 52 is constituted with the first decoder 92 and the parameter cutout circuit 94, and is equivalent to the D stage 32 in FIG. 27.

Numeral 41 designates the D code, which is constituted with the intermediate code 93 outputted from the first decoder 92 and a parameter latch 95 latching a parameter outputted from the parameter cut-out circuit 94.

Numeral 96 designates a second decoder, which is constituted with a PLA (Programmable Logic Array) for decoding an instruction like the first decoder 92. The second decoder 96 is given the D code 41, and gives the result of decoding this to a micro entry address latch 98 and an operation designating parameter generating circuit 99.

The operation designating parameter generating circuit 99 generates an operation designating parameter PARM-R from a PARMCNT signal and a PARM signal (the first bit field) which are given from a decoder, such as the second decoder 96, and a signal PARM-D given from the parameter latch 95, and outputs the operation designating parameter PARM-R to an operation designating parameter latch 100.

The operand address calculation unit 54 is constituted with the second decoder 96 and the operation parameter generating circuit 99, and is equivalent to the A stage 33 in FIG. 27.

The contents latched respectively in the micro entry address latch 98 and the operation designating parameter latch 100 constitutes the R code 43.

Numeral 104 designates a next micro address selecting circuit, and is given the micro entry address latched in the micro entry address latch 98, and thereby reads out a micro address required next, and makes a microinstruction register 106 store it.

The micro-instruction register 106 gives a microinstruction which is the content stored therein to a microinstruction decoder 107, and returns part thereof to the next micro address selecting circuit 104.

The micro-instruction decoder 107 generates the E code 45 from the result of decoding the micro-instruction given from the micro-instruction register 106 and the operation designating parameter given from the operation designating parameter latch 100, and outputs it.

The above-mentioned next micro address selecting circuit 104, micro ROM 55, micro-instruction register 106 and micro-instruction decoder 107 are equivalent to the R stage 36 in FIG. 27.

The E code 45 is given to the data operation unit 56. Then, in the data operation unit 56, the instruction fetched in the instruction fetch unit 51 is executed according to the E code 45.

A description is next provided of the operation of such a data processor of the present invention.

When an instruction code is outputted from the instruction fetch unit 51, and is decoded by the first decoder in the instruction decoding unit 52, the intermediate code and the parameter cut-out control signal EXTCNT are generated from the decoding result.

On the other hand, part of the instruction code outputted from the instruction fetch unit 51 is cut out by the parameter cut-out circuit 94, and the result thereof is latched in the parameter latch 95. Which bit is to be cut out by the parameter cut-out circuit 94 is controlled by the parameter cut-out control signal EXTCNT outputted from the first decoder 92.

FIG. 31 shows a relationship between the parameter cut-out control signals EXTCNT 324 and the parameters cut out in response thereto 326. FIG. 31 depicts a preferred embodiment, and other relationships could be devised which would be operable in the present invention.

In the table of FIG. 31, D00–D15 designates a 16-bit instruction code outputted from the instruction fetch unit 51, and a six-bit parameter is cut out from among these 16 bits by control of the parameter cut-out control signal EXTCNT as shown in the table in FIG. 31. Note that where the EXTCNT signal 324 is "100," the information latched previously is retained intact, and rewrite is not performed.

The contents of the intermediate code 93 and the parameter latch 95 are sent to the A stage 33 as the D code 41. Also, the contents of the intermediate code 93 and the parameter latch 95 are decoded by the second decoder 96, and a micro entry address is generated. This micro entry address is latched in the micro entry address latch 98.

On the other hand, an operation designating parameter is generated from part of the output result of the second decoder 96 and the content of the parameter latch 95 by the operation designating parameter generating circuit 99, and the result thereof is latched in the operation designating parameter latch 100.

The content of the micro entry address latch 98 and the content of the operation designating parameter latch 100 are sent to the R stage 36 as the R code 43.

Figure 32:
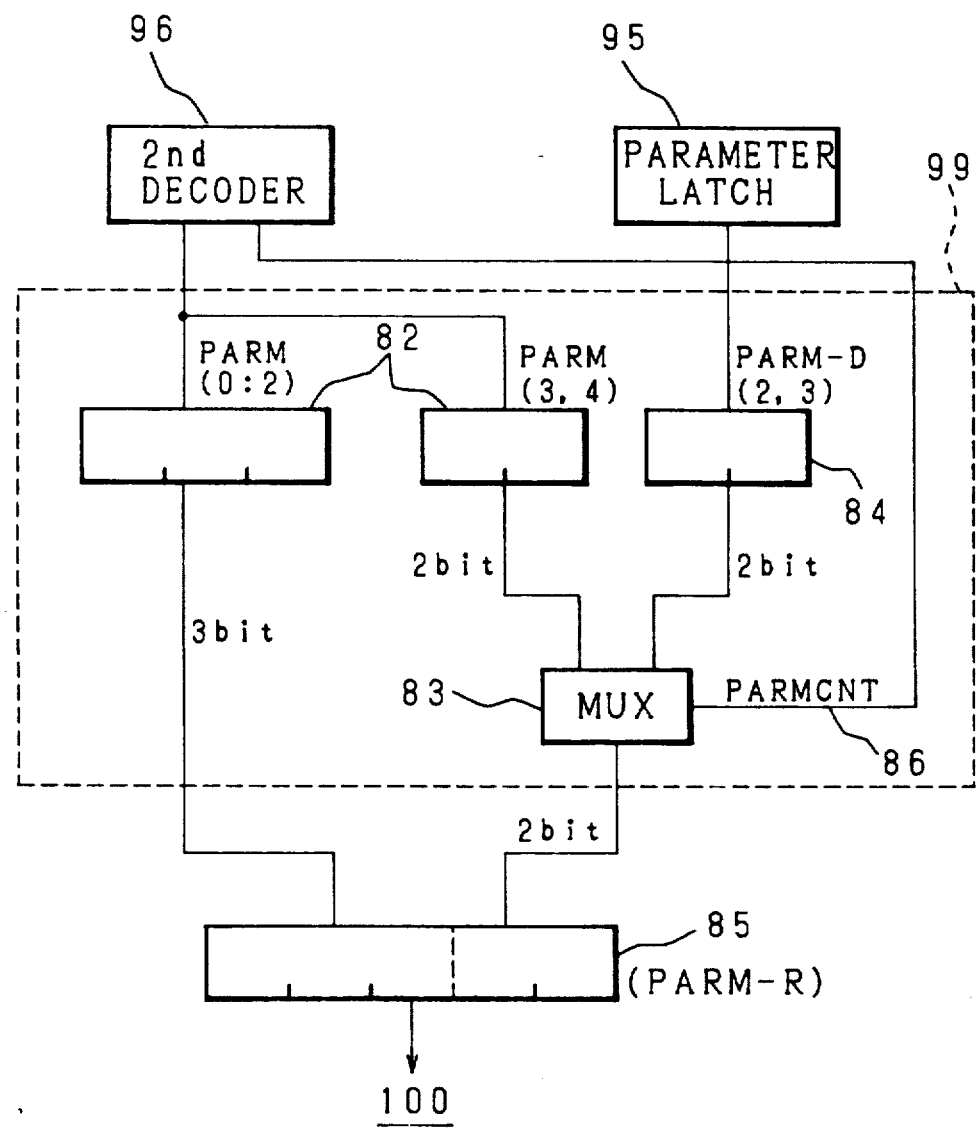
FIG. 32 is a block diagram showing a configuration of an operation designating parameter generating circuit.

A detailed description is next provided of the operation designating parameter generating circuit 99. FIG. 32 is a block diagram showing a configuration of the operation designating parameter generating circuit 99.

In the operation designating parameter generating circuit 99, the latched content PARM-D of the parameter latch 95, a five-bit PARM signal 82 and a one-bit PARMCNT signal 86 which are outputted from the second decoder 96 are inputted, and an operation designating parameter PARM-R 85 is generated. In the PARM signal 82, three bits from the 0th bit to the second bit become the PARM-R signal 85 intact.

On the other hand, where the PARMCNT signal 86 is "1," the second bit and the third bit of a PARM-D signal 84 which is an output of the parameter latch 95 of the D code 41 become two low-order bits of the PARM-R signal 85, and where the PARMCNT signal 86 is "0," the third bit and the fourth bit of the PARM signal 82 become two low-order bits of the PARM-R signal 85. Selection of the both is executed by a multiplexer (MUX) 83 controlled by the PARMCNT signal 86.

The PARM-R signal is generated as described above. This PARM-R signal becomes the content of the operation designating parameter latch 100 in the R code 43 as shown in FIG. 30.

Figure 35:
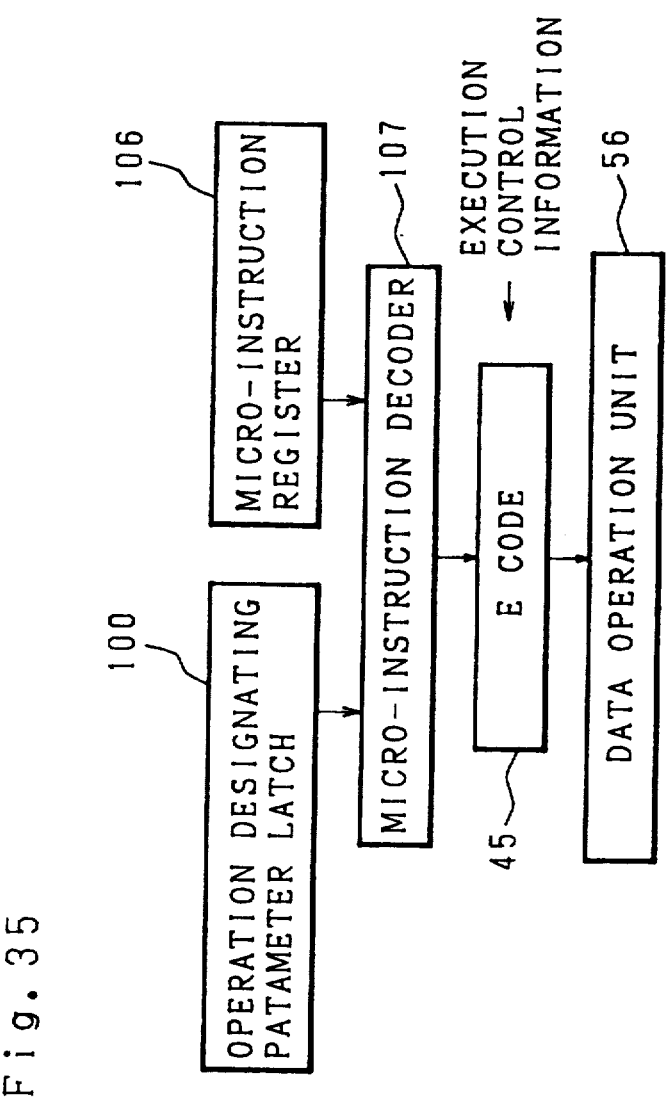
FIG. 35 is a block diagram showing the relationship of the micro-instruction register and operation-designating parameter latch to the data operation unit.

The next micro address selection circuit 104 reads a micro-instruction from the micro ROM 55 according to the content of the micro entry address latch 98. The read micro-instruction is latched in the micro-instruction register 106. As shown in FIG. 35, the latched content of the micro-instruction register 106 is given to the micro decoder 107.

Also, part of the micro-instruction latched in the micro-instruction register 106 is returned to the next micro address selection circuit 104, being used to determine the micro-instruction address to be read next.

The content of the operation designating parameter latch 100 is also given to the micro-instruction decoder 107. The micro-instruction decoder 107 decodes the content of the micro-instruction register 106 and the content of the operation designating parameter latch 100. The decoding result becomes the E code 45 which is control signal group of the data operation unit 56. The E code 45 is given to the data operation unit 56, and according to this, operation is executed in the data operation unit 56.

FIG. 29 shows, for example, a table of operation designating parameters of MOV instruction (transfer), ADD instruction (addition), SUB instruction (subtraction), AND instruction (logical product), OR instruction (logical sum) and XOR instruction (exclusive-or), mask information for six flags (F flag, X flag, V flag, L flag, M flag and Z flag) and operation information in the ALU.

All of these instructions are executed by the same micro-instruction. Operation designating in the ALU and designating whether or not a flag is to be changed for the operation result are executed by the operation designating parameter.

Description is made hereinafter on procedures of generating the operation designating parameter with the MOV instruction taken as an example.

FIG. 33 shows the bit allocation of three kinds of MOV instructions having different formats.

MOV:G MOV:Q and MOV:L are the MOV instructions of G-format 330, Q-format 332, and L-format 334, respectively. Bit allocation differs greatly depending on each format.

FIG. 34 shows the EXTCNT signal 336 in each instruction processing, the parameter value 338 of the D code 41 latched in the parameter latch 95 and the PARM signal 82 and the PARMCNT signal 86 which are outputted from the second decoder 96. FIG. 34 depicts a preferred embodiment, and other signal relationships could be devised which would be operable in the present invention, including PARMCNT passthrough signals, etc.

In the MOV:G instruction, part of the instruction code and the PARM signal 82 outputted from the second decoder 96 are composed to generate the operation designating parameter, and in the MOV:Q instruction and the MOV:L instruction, the operation designating parameter is generated only by the PARM signal 82. Thus, the same operation designating parameter ("10010") is designated by three kinds of formats of different bit allocations, being processed by the same micro-instruction.

Here, the MOV instruction is enumerated as an example, but many other instructions can be processed likewise. Accordingly, the capacity, in another word, area of the micro ROM 55 can be reduced to a large extent.

Also, in the operation designating parameter generating circuit 99, as described above, part of the instruction code can be taken as a parameter. Description is made thereon with the AND instruction, OR instruction and the XOR instruction enumerated as examples.

As described above, these instructions can be executed by the same micro-instruction. Also, in the AND instruction, OR instruction and the XOR instruction, almost all of bit patterns in each instruction code are the same, and only two bits are different. The field of these two bits becomes "00 in the AND instruction, becomes "01" in the OR instruction, and becomes "10" in the XOR instruction.

Accordingly, as shown in FIG. 29, by rewriting the value of these two bits as two low-order bits of the operation designating parameter by the operation parameter generating circuit 99, three kinds of instructions can be decoded by the same product term line of the second decoder 96. In other words, similar processing can be executed with respect to the ADD instruction, the SUB instruction or other instructions. By this, the area of the second decoder 96 can be reduced by taking part of the instruction code as a parameter.

The manner in which operation of the operation components 410, 412, 414 (FIG. 26B) of the data operation unit 56 are controlled by the E code 45 will now be described. The description will be made with respect to the functioning of the ALU 410, although it will be apparent to those skilled in the art how functioning of other operation components is controlled by E code 45. Table 1 depicts various values for the ALU field of a micro-instruction and the operation designating the parameter. For each of the inputs shown, corresponding outputs are indicated which include the input control to the DA and DB registers 416, 418, the operation which is performed in the ALU, and the output control to the DO bus 440. As is well known in the art, the output which controls operation of the data operation unit 56 is actually a control signal among several dozen possible control signals. However, in Table 1, for ease of understanding, the output is designated at the mnemonic level. As shown in Table 1, the ALU field is 7 bits and the parameter is 5 bits. When the upper three bits of the ALU field have a value other than "111," then 7 bits of the ALU field are decoded and, from this, the execution control field for the ALU is generated. In cases where the highest three bits of the ALU field are "111," the upper three bits of the ALU field and the five bits of the parameter are decoded and the execution control field of the ALU is generated based on this combination. The decoding operation is executed random-logically. The lowest three entries in Table 1 are for processing of a MOV instruction, a SUB instruction, and an AND instruction, respectively. The same micro-instruction 106 is used in all three of these instructions.

TABLE 1

| Input | | Output | | | |
|---|---|---|---|---|---|
| ALU Field Of Microinstruction | Parameter | Input Control To DA | Input Control To DB | Operation In ALU | Output Control To DO Bus |
| 001 0011 | ***** | S1BUS→DA | S2BUS→DB | DA+DB→DOUT (ADD) | DOUT→DOBUS |
| 001 1000 | ***** | DA→DA | O→DB | DA\|DB→DOUT ( OR) | DOUT→DOBUS |
| 001 1011 | ***** | DA→DA | S2BUS→DB | DA\|DB→DOUT ( OR) | DOUT→DOBUS |
| 001 1111 | ***** | S1BUS→DA | S2BUS→DB | DA\|DB→DOUT ( OR) | DOUT→DOBUS |
| 111 **** | 1001* | S1BUS→DA | O→DB | DA\|DB→DOUT ( OR) | DOUT→DOBUS |
| 111 **** | 0001* | S1BUS→DA | S2BUS→DB | DB−DA→DOUT (SUB) | DOUT→DOBUS |
| 111 **** | 01000 | S1BUS→DA | S2BUS→DB | DA&DB→DOUT (AND) | DOUT→DOBUS |

*: DON'T CARE

In addition, in the above-mentioned embodiment, decoding of an instruction is executed in two stages of the first decoder 92 and the second decoder 96, and therefore a configuration is adopted wherein there are provided an instruction execution means (the data operation unit 56) for executing an instruction, an instruction decoding means (the first decoder 92) which decodes an instruction code of a machine-language instruction to be executed by the instruction execution means, and generates a first bit field in response to the result of this decoding, a cut-out means (the parameter cut-out circuit 94) for cutting out part or all of the instruction code as a second bit field, and a parameter generating means (the operation designating parameter generating circuit 99) which selects either of the first bit field generated by the instruction decoding means and the second bit field cut out by the cut-out means, and outputs it as part or all of the parameters to become information on controlling execution for the instruction execution means.

However, this is because the decoding of an instruction is executed in two stages of the first decoder 92 and the second decoder 96. The present invention can be applied also to a data processor having a general configuration of decoding an instruction in one stage. In that case, a configuration has only to be adopted which provides an instruction execution means (the data operation unit 56) which executes an instruction, an instruction decoding means (the first decoder 92) which decodes an instruction code of a machine-language instruction to be executed by the instruction execution means, and generates a bit field in response to the result of this decoding, and a parameter generating means (the operation designating parameter generating circuit 99) which selects either of the bit field generated by the above-mentioned instruction decoding means and part of the above-mentioned instruction code, and outputs it as part or all of parameters to become information on controlling execution for the above-mentioned instruction execution means.

Also, in the above-mentioned embodiment, the D code parameter PARM-D is once generated, and thereafter the operation designating parameter is generated, but part of the operation designating parameter may be generated directly from the instruction code.

Also, in the above-mentioned embodiment, part of the parameters are fixed to the output of the decoder, but all of the parameters may be set by the parameters cut out from the instruction code and the result of selection of the result of decoding the instruction.

Also, it is also possible that for the operation designating parameter, a plurality of combined patterns of the result of decoding and the instruction code are set in advance, and they are selected.

Also, in the above-mentioned embodiment, operation designating of the ALU and designating of the flag mask are executed by the operation designating parameter, but it is also possible that operation designating or size designating of other arithmetic units such as the barrel shifter is executed using the operation designating parameter.

As detailed above, in the data processor of the present invention, the operation designating parameter is generated by selecting and composing the parameter cut out from the instruction code and the result of decoding the instruction, and thereby operation can be executed by the same micro-program for the same instructions having different instruction formats, and therefore the sizes of the micro ROM and the decoder can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. In a data processor having a controllable instruction execution device for executing an instruction according to micro-instructions stored in a micro-ROM, apparatus for providing control information usable for controlling said instruction execution device, comprising:

an instruction decoding means different from said micro-ROM for decoding an instruction code in machine language of said instruction to be executed by said instruction execution device, generating a control signal over a first data line, generating a micro-instruction entry address over a second data line and generating a bit field in response to the decoding result and outputting a first bit string containing said bit field to a first data bus;

a latch for holding at least a part of said instruction code; and means, coupled to said first data line for receiving said control signal, coupled to said first data bus, for receiving said first bit string and coupled to said latch for receiving a second bit string, said second bit string comprising said part of said instruction code for selecting, in response to said control signal, one of said first bit string and said second bit string and for outputting said selected bit string as at least part of a parameter, said parameter being usable as execution controlling information for said micro-instruction execution, whereby said micro-ROM may be used to process a single instruction having a plurality of formats.

2. Apparatus, as claimed in claim 1, further comprising:

means for extracting bits comprising at least part of said instruction code as a second bit field.

3. Apparatus, as claimed in claim 2, wherein said instruction decoding means generates a third bit field in response to the decoding result, and further comprising:

means for concentrating said third bit field with said selected bit field.

4. Apparatus, as claimed in claim 1, wherein said means for receiving and selecting includes a controllable multiplexer.

5. Apparatus, as claimed in claim 4, wherein said controllable multiplexer is controlled by said control signal from said instruction decoding means.

6. In a data processor having a controllable instruction device for executing an instruction, apparatus for providing control information usable for controlling said instruction execution device, comprising:

a first instruction decoding means for decoding at least a portions of an instruction code of a machine language, and for generating a parameter extraction control signal;

a controllable parameter extraction device, coupled to said first decoding means, for extracting a plurality of bits from said instruction code in response to said parameter extraction control signal to form a first bit field and the remaining extracted bits;

a second decoding means, coupled to said extraction device, for decoding at least portions of said remaining extracted bits, generating a second bit field and a third bit field, and generating a parameter control signal;

a controllable multiplexer, coupled to said second decoding means and said controllable parameter extraction device, for selecting either said second bit field or at least a portion of said first bit field in response to said parameter control signal, as a selected field, with the other of at least a portion of said first bit field and, said second bit field being a non-selected bit field and outputting a fourth bit field containing said selected bit field; and means for concatenating said third bit field and said fourth bit field without concatenating with said non-selected bit field, whereby the same instruction may be used with different bit fields to perform a variety of operations in accordance with the parameter selection.

7. In a data processor having an instruction execution device for executing any of a plurality of instructions, said instructions including at least a first instruction which is present in two different formats, said instruction execution device being controllable by a parameter bit string, apparatus which permits reduction of the size of a micro-instruction read only memory by providing a single set of micro-instructions usable for said different formats of said first instruction, comprising:

an instruction fetch unit;

a first decoder, coupled to said instruction fetch unit, for decoding part of an instruction and generating an intermediate code and an extraction control signal;

a controllable extraction device, coupled to said instruction fetch unit, for extracting a plurality of bits from said instruction code in response to said parameter extraction control signal and outputting said extracted bits to form a first bit field;

a second decoder for receiving said intermediate code and said extracted bits and generating a microentry address, a parameter control signal, and second and third bit fields;

a controllable multiplexer, coupled to said second decoding means and said extraction device, for receiving said first bit field and said second bit field and for outputting one of said first bit field and said second bit field in response to said parameter control signal to form a fourth bit field as a selected field, with the other of said first bit field and said second bit field being a non-selected field; and means for concatenating said third bit field with said fourth bit field to form an operation-designating parameter without concatenating with said non-selected field, whereby the same instruction may be used with different bit fields to perform a variety of operations in accordance with the parameter selection.

* * * * *